United States Patent
MacCallum

(10) Patent No.: US 8,985,474 B2
(45) Date of Patent: Mar. 24, 2015

(54) SPACE HUMIDITY CONTROL SYSTEMS

(75) Inventor: Taber K. MacCallum, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 617 days.

(21) Appl. No.: 13/350,581

(22) Filed: Jan. 13, 2012

(65) Prior Publication Data

US 2012/0183457 A1    Jul. 19, 2012

Related U.S. Application Data

(60) Provisional application No. 61/433,494, filed on Jan. 17, 2011, provisional application No. 61/499,647, filed on Jun. 21, 2011.

(51) Int. Cl.
| | | |
|---|---|---|
| *F24F 3/14* | (2006.01) | |
| *B01D 53/26* | (2006.01) | |
| *G05D 22/00* | (2006.01) | |
| *B01D 53/22* | (2006.01) | |

(52) U.S. Cl.
CPC .............. *B01D 53/268* (2013.01); *B01D 53/22* (2013.01); *B01D 2258/06* (2013.01); *B01D 2259/4575* (2013.01)
USPC .............................. 236/44 A; 95/52; 422/120

(58) Field of Classification Search
CPC ........... B01D 53/26; B01D 53/28; F24F 3/14; F24F 3/1411; F24F 2003/14; F24F 2003/114; G05D 22/00; A62B 11/00
USPC ........ 236/44 A, 44 C; 95/52; 422/120; 261/2, 261/5
See application file for complete search history.

(56) References Cited

U.S. PATENT DOCUMENTS

| | | | |
|---|---|---|---|
| 3,735,559 A | | 5/1973 | Salemme |
| 4,612,019 A | | 9/1986 | Langhorst |
| 5,096,549 A | | 3/1992 | Yamauchi et al. |
| 5,281,254 A | | 1/1994 | Birbara et al. |
| 5,348,691 A | | 9/1994 | McElroy et al. |
| 5,595,690 A | | 1/1997 | Filburn et al. |
| 5,620,500 A | * | 4/1997 | Fukui et al. ................ 95/52 |
| 5,843,209 A | * | 12/1998 | Ray et al. .................. 95/52 |
| 5,869,323 A | | 2/1999 | Horn |
| 6,346,142 B1 | | 2/2002 | Jetter et al. |
| 6,413,298 B1 | | 7/2002 | Wnek et al. |
| 6,610,122 B1 | | 8/2003 | Filburn et al. |
| 6,673,136 B2 | | 1/2004 | Gillingham et al. |
| 7,270,692 B2 | | 9/2007 | Gillingham et al. |
| 7,435,284 B2 | | 10/2008 | Piccinini et al. |
| 7,753,991 B2 | | 7/2010 | Kertzman |
| 2007/0041796 A1 | | 2/2007 | Irie et al. |
| 2007/0264538 A1 | | 11/2007 | Schank et al. |
| 2009/0114090 A1 | | 5/2009 | Gu et al. |
| 2009/0226784 A1 | | 9/2009 | Kim |
| 2010/0226824 A1 | | 9/2010 | Ophir et al. |

FOREIGN PATENT DOCUMENTS

| | | |
|---|---|---|
| EP | 562747 A2 | 9/1993 |
| JP | 11137946 A | 5/1999 |

* cited by examiner

*Primary Examiner* — Marc Norman
(74) *Attorney, Agent, or Firm* — Weaver Austin Villeneuve & Sampson LLP

(57) ABSTRACT

Systems and methods utilizing water-vapor-partial-pressure-differential across a chemically-selective membrane to remove water vapor from a habitable spacecraft environment(s). The system preferably utilizes heat from an exothermic $CO_2$ removal process to prevent condensation at the chemically-selective membrane.

33 Claims, 10 Drawing Sheets

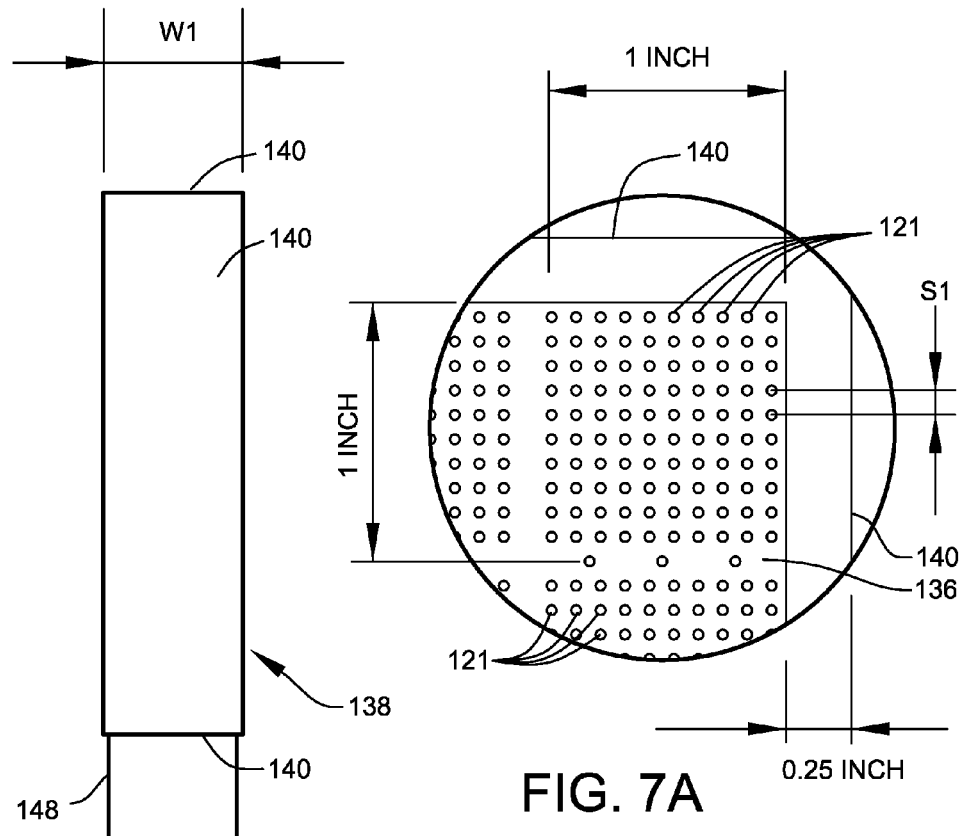
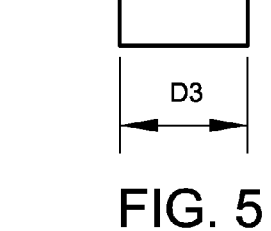
FIG. 5
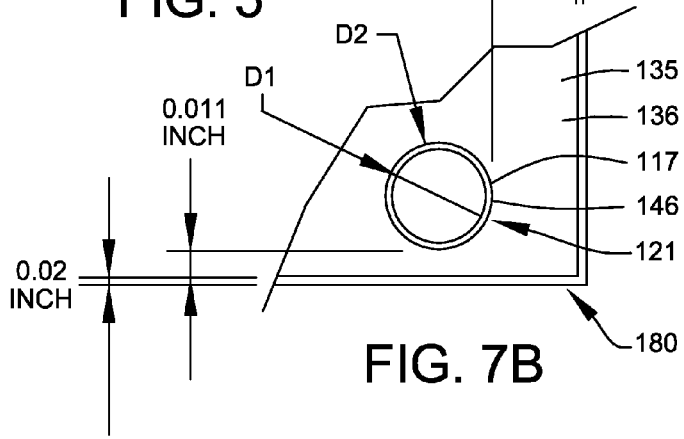
FIG. 7A
FIG. 7B
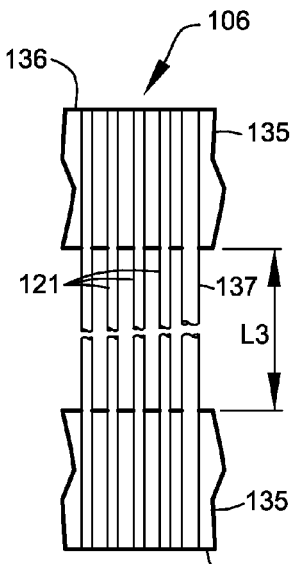
FIG. 8

SPACE HUMIDITY CONTROL SYSTEMS

CROSS-REFERENCE TO RELATED APPLICATION

The present application is related to and claims priority from prior provisional application Ser. No. 61/499,647, filed Jun. 21, 2011, entitled "SPACE HUMIDITY CONTROL SYSTEMS"; and, this application is related to and claims priority from prior provisional application Ser. No. 61/433,494, filed Jan. 17, 2011, entitled "SPACE HUMIDITY CONTROL SYSTEMS", the contents of all of which are incorporated herein by this reference and are not admitted to be prior art with respect to the present invention by the mention in this cross-reference section.

BACKGROUND

This invention relates to providing a system for improved space humidity control. More particularly, this invention relates to providing a system for assisting the removal of metabolic water vapor from a habitable spacecraft environment.

Of all human endeavors, few are more demanding than manned spaceflight. Vehicles to support human spaceflight must necessarily comprise the characteristics of safety, high reliability, and operational simplicity. In practical terms, these space-operated apparatus must also strive to control development costs, operational costs, and vehicle mass, insomuch as these secondary criteria do not unduly impact safety and reliability.

A critical component of manned spacecraft is the environmental control and life support subsystem. Such subsystems are designed to support the physiological and metabolic needs of a human crew during mission operations. Included in this support is the maintaining of a habitable atmosphere through the control of temperature, oxygen, carbon dioxide, and humidity levels.

A need exists for new technologies to advance the capabilities of crew transport vehicles in the above-noted areas.

OBJECTS AND FEATURES OF THE INVENTION

A primary object and feature of the present invention is to provide a system overcoming the above-mentioned problem(s).

It is a further object and feature of the present invention to provide such a system providing safety, high reliability, operational simplicity, and lower cost and mass compared to other humidity-control technologies. It is another object and feature of the present invention to provide such a system that preferably assists in removing metabolic water vapor from a habitable spacecraft environment. It is a further object and feature of the present invention to provide such a system that utilizes a water-vapor-partial-pressure-differential across a chemically-selective membrane to remove water vapor from the habitable spacecraft environment. It is another object and feature of the present invention to provide such a system that preferably utilizes heat from an exothermic $CO_2$ removal process to prevent condensation at the chemically-selective membrane.

A further primary object and feature of the present invention is to provide such a system that is efficient, adaptable to many applications, inexpensive, and useful. Other objects and features of this invention will become apparent with reference to the following descriptions.

SUMMARY OF THE INVENTION

In accordance with a preferred embodiment hereof, this invention provides a system, relating to assisting removing water vapor from at least one breathable atmosphere within at least one enclosed environment, such system comprising: at least one water-vapor remover structured and arranged to remove the water vapor from at least one airflow derived from the at least one breathable atmosphere; wherein such at least one water-vapor remover comprises at least one chemically-selective passage structured and arranged to provide selective passage of the water vapor based on chemical affinity, and at least one transport-driver structured and arranged to drive transport of the water vapor across such at least one chemically-selective passage; wherein such at least one transport-driver comprises at least one water-vapor-partial-pressure-differential provider structured and arranged to provide at least one water-vapor-partial-pressure differential across such at least one chemically-selective passage; wherein such at least one water-vapor-partial-pressure-differential provider comprises at least one exposure pathway structured and arranged to expose such at least one chemically-selective passage to at least one ambient environment external of the at least one enclosed environment; and wherein such at least one water-vapor remover is structured and arranged to selectively purge the water vapor from the at least one airflow through such at least one chemically-selective passage to the at least one ambient environment when at least one water-vapor partial pressure of the at least one ambient environment is less than that of the at least one airflow.

Moreover, it provides such a system further comprising: at least one air conductor structured and arranged to conduct the at least one airflow derived from the at least one breathable atmosphere; wherein such at least one air conductor comprises at least one containment wall structured and arranged to contain the at least one airflow during such conduction; wherein at least one portion of such at least one containment wall comprises at least one chemically-selective membrane; and wherein such at least one chemically-selective membrane comprises such at least one chemically-selective passage. Additionally, it provides such a system wherein such at least one chemically-selective membrane comprises at least one sulfonated perfluorinated ionomer. Also, it provides such a system wherein such at least one chemically-selective membrane comprises at least one copolymer of perfluoro-3,6-dioxa-4-methyl-7octene-sulfonic acid and tetrafluoroethylene.

In addition, it provides such a system wherein such at least one water-vapor-partial-pressure-differential provider further comprises: at least one dry-gas coupler structured and arranged to communicatively couple such at least one chemically-selective membrane with at least one dry-gas source configured to supply at least one dry gas; wherein such at least one water-vapor remover is structured and arranged to selectively transport the water vapor through such at least one chemically-selective membrane from the at least one airflow to the at least one dry gas when the at least one dry gas is supplied by the at least one dry-gas source.

And, it provides such a system wherein such at least one water-vapor remover further comprises: at least one water-vapor removal module comprising a plurality of tubular passages each one structured and arranged to conduct a portion of the at least one airflow; wherein each tubular passage of such plurality comprises such at least one chemically-selective membrane. Further, it provides such a system wherein each such at least one water-vapor removal module comprises between about 17,500 and about 28,000 tubular passages.

Even further, it provides such a system wherein each such at least one water-vapor removal module comprises: at least one housing to house such plurality of tubular passages; wherein such at least one housing comprises at least four adjoining side walls, at least one forward opening, at least one rear opening, and at least one interior region situate within such at least four adjoining side walls, such at least one forward opening, and such at least one rear opening; wherein such at least one forward opening and such at least one rear opening are configured to inlet and discharge the at least one airflow; wherein at least one of such at least four side walls comprises at least one vacuum vent access port structured and arranged to establish at least one fluid connection between such at least one interior region and such at least one exposure pathway. Moreover, it provides such a system further comprising: located at such at least one forward opening and such at least one rear opening, at least one tubular passage positioned structured and arranged to position open end portions of each such tubular passage within such at least one housing; wherein each such at least one tubular passage positioner is structured and arranged to permit fluid exposure of at least one wall portion of such tubular passages to fluids introduced within such at least one interior region.

Additionally, it provides such a system wherein: each such at least four adjoining side walls comprises at least one wall length and at least one wall width; such at least one wall length is greater than such at least one wall width; and such at least one vacuum vent access port comprises at least one open interior span greater than such at least one wall width of such at least four adjoining side walls. Also, it provides such a system wherein: each such at least one water-vapor removal module comprises at least two separate such at least one vacuum vent access ports; and each such at least one vacuum vent access port comprises at least one essentially elliptical-shape. In addition, it provides such a system wherein: such at least one exposure pathway comprises at least one vacuum vent line structured and arranged to assist coupling of such at least one vacuum vent access port to at least one vacuum of the ambient environment external of the at least one enclosed environment; such at least one vacuum vent line comprises at least one transition structured and arranged to transition an open interior geometry of such at least one vacuum vent line from at least one open interior geometry matching such at least one essentially elliptical-shape, of such at least one vacuum vent access port, to at least one substantially circular open interior geometry having a cross-sectional area substantially matching that of such at least one essentially elliptical-shape.

And, it provides such a system wherein: such at least one water-vapor removal module comprises at least one structural-deformation resistor structured and arranged to resist structural deformation of such tubular passage in the presence of a vacuum-pressure load; wherein such at least one structural-deformation resistor comprises a plurality of support columns structured and arranged to resist pressure loading imparted by at least one atmospheric pressure differential between the at least one airflow and the vacuum; and wherein such plurality of support columns are interspersed within such plurality of tubular passages. Further, it provides such a system further comprising: at least one first such at least one water-vapor removal module and at least one second such at least one water-vapor removal module each one structured and arranged to be placed in fluid communication with such at least one exposure pathway and the at least one airflow; wherein such at least one first such at least one water-vapor removal module and such at least one second such at least one water-vapor removal module are arranged in series with respect to the at least one airflow.

Even further, it provides such a system wherein: such at least one exposure pathway comprises at least one isolator valve structured and arranged to reversibly isolate either one of such at least one first such at least one water-vapor removal module and such at least one second such at least one water-vapor removal module from such at least one exposure pathway; wherein operation of each such at least one water-vapor removal module is independently terminatable by closing of such at least one isolator valve. Moreover, it provides such a system further comprising: at least one condensation preventer structured and arranged to assist in preventing condensation of the water vapor at such at least one chemically-selective passage; wherein such at least one condensation preventer comprises at least one heat provider structured and arranged to heat such at least one chemically-selective passage.

Additionally, it provides such a system wherein such at least one heat provider comprises at least one exothermic gaseous-carbon-dioxide remover structured and arranged to produce at least one heat output during such removal of the gaseous carbon dioxide from the at least one airflow. Also, it provides such a system wherein such at least one exothermic gaseous-carbon-dioxide remover is structured and arranged to utilize at least one exothermic lithium-hydroxide (LiOH) reaction. In addition, it provides such a system further comprising at least one liquid-water filter structured and arranged to filter liquid water from the at least one airflow prior to passing through such at least one water-vapor removal module. And, it provides such a system wherein: such at least one liquid-water filter comprises a plurality of pores structured and arranged to pass at least one portion of the at least one airflow; and substantially all pores of such plurality comprise a maximum size smaller than a maximum internal size of each such tubular passage.

Further, it provides such a system further comprising at least one airflow distributor structured and arranged to assist even distribution of the at least one airflow through such at least one water-vapor removal module. Even further, it provides such a system further comprising at least one contaminant remover structured and arranged to remove contaminants from the at least one airflow. Moreover, it provides such a system wherein such at least one contaminant remover comprises at least one particulate filter structured and arranged to filter particulates from the at least one airflow prior to passing through such at least one water-vapor removal module. Additionally, it provides such a system wherein such at least one air conductor further comprises; at least one inlet to inlet the at least one airflow comprising at least one portion of at least one breathable atmosphere; at least one outlet to outlet the at least one airflow from such at least one air conductor; and at least one air movement generator structured and arranged to generate movement of the at least one airflow between such at least one inlet and such at least one outlet.

Also, it provides such a system wherein: with respect to the at least one airflow, such at least one exothermic gaseous-carbon-dioxide remover, such at least one liquid-water filter, such at least one airflow distributor, and such at least one water-vapor remover are coupled in operable series within such at least one air conductor; and within such operable series, at least such at least one exothermic gaseous-carbon-dioxide remover and such at least one liquid-water filter are structured and arranged to process the at least one airflow in advance of such at least one water-vapor remover.

In accordance with another preferred embodiment hereof, this invention provides a system, relating to assisting removing water vapor from at least one breathable atmosphere within at least one enclosed environment, such system comprising: a set of water-vapor removers each water-vapor remover of such set structured and arranged to remove the water vapor from at least one airflow derived from the at least one breathable atmosphere; wherein each such water-vapor remover comprises at least one chemically-selective membrane structured and arranged to provide selective passage of the water vapor based on chemical affinity; and at least one transport-driver structured and arranged to drive transport of the water vapor across such at least one chemically-selective membrane; wherein such at least one transport-driver comprises at least one water-vapor-partial-pressure-differential provider structured and arranged to provide at least one water-vapor-partial-pressure differential across such at least one chemically-selective membrane; wherein such at least one water-vapor-partial-pressure-differential provider comprises at least one exposure pathway structured and arranged to enable exposure of such at least one chemically-selective membrane to at least one gas-pressure region having at least one water-vapor partial pressure lower than that of the at least one airflow; wherein such at least one exposure pathway comprises at least one isolator valve structured and arranged to reversibly isolate either one of such water-vapor removers from such at least one exposure pathway; wherein operation of each such water-vapor removers is independently terminatable by closing of such at least one isolator valve.

In addition, it provides such a system further comprising: at least one condensation preventer structured and arranged to assist in preventing condensation of the water vapor at such at least one chemically-selective membrane; wherein such at least one condensation preventer comprises at least one heat provider structured and arranged to heat such at least one chemically-selective membrane during operation. And, it provides such a system wherein: such at least one heat provider comprises at least one exothermic gaseous-carbon-dioxide remover structured and arranged to produce at least one net heat output during such removal of the gaseous carbon dioxide from the at least one airflow; and with respect to the at least one airflow, such at least one exothermic gaseous-carbon-dioxide remover and such water-vapor removers are coupled in operable series within such at least one air conductor; and within such operable series, such at least one exothermic gaseous-carbon-dioxide remover is structured and arranged to process the at least one airflow in advance of such water-vapor removers. Further, it provides such a system wherein such at least one chemically-selective membrane comprises at least one sulfonated perfluorinated ionomer. Even further, it provides such a system wherein such at least one chemically-selective membrane comprises at least one copolymer of perfluoro-3,6-dioxa-4-methyl-7octene-sulfonic acid and tetrafluoroethylene.

Even further, it provides such a system wherein such at least one exposure pathway is structured and arranged to expose such at least one chemically-selective membrane to at least one ambient vacuum environment external of the at least one enclosed environment. Even further, it provides such a system further comprising: at least one flow controller to control at least one volume of the at least one airflow passing through such set of water-vapor removers; wherein such at least one flow controller comprises at least one airflow bypass structured and arranged to bypass at least one portion of the at least one airflow past at least one of such water-vapor removers.

In accordance with another preferred embodiment hereof, this invention provides a system, relating to assisting removing metabolic water vapor from at least one habitable spacecraft environment, comprising: water-vapor-remover means for removing the metabolic water vapor from the at least one habitable spacecraft environment; wherein such water-vapor remover means comprises chemically-selective-passage means for allowing the selective passage of the metabolic water vapor based on chemical affinity, and transport-driver means for driving transport of the metabolic water vapor across such chemically-selective passage means; wherein such transport-driver means comprises water-vapor-partial-pressure-differential provider means for providing at least one water-vapor-partial-pressure differential across such chemically-selective passage means; wherein such at least one water-vapor-partial-pressure-differential provider comprises exposure means for exposing such chemically-selective-passage means to at least one ambient flight environment external of the at least one habitable spacecraft environment; and wherein such chemically-selective-passage means selectively removes the metabolic water vapor from the at least one airflow when at least one water-vapor partial pressure of the at least one ambient flight environment is less than that of the at least one airflow.

In accordance with another preferred embodiment hereof, this invention provides a method, relating to assisting removing metabolic water vapor from at least one breathable atmosphere of at least one habitable spacecraft environment, comprising the steps of: providing at least one air-conduction pathway structured and arranged to conduct at least one airflow comprising at least one portion of the at least one breathable atmosphere; providing at least one water-vapor remover structured and arranged to remove the metabolic water vapor from the at least one airflow wherein such at least one water-vapor remover comprises at least one chemically-selective passage structured and arranged to provide selective passage of the metabolic water vapor based on chemical affinity; and exposing such at least one chemically-selective passage to at least one low-pressure vacuum of at least one ambient flight environment external of the at least one habitable spacecraft environment to drive transport of the metabolic water vapor across such at least one chemically-selective passage; whereby such at least one chemically-selective passage selectively removes the metabolic water vapor from the at least one airflow. Even further, it provides such a method further comprising the steps of: providing at least one carbon dioxide remover to remove carbon dioxide (CO2) from the at least one airflow wherein such at least one carbon dioxide remover comprises at least one heat producing exothermic reaction; reducing water-vapor condensation at such at least one chemically-selective passage by heating such at least one chemically-selective passage using such at least one heat producing exothermic reaction. Even further, it provides such a method wherein such at least one chemically-selective passage comprises at least one sulfonated perfluorinated ionomer. In accordance with another preferred embodiment hereof, this invention provides each and every novel feature, element, combination, step and/or method disclosed or suggested by this patent application.

BRIEF DESCRIPTION OF THE DRAWINGS

FIG. 5 shows a side view, illustrating the water-vapor removal module of FIG. 2.

FIG. 7A shows a partial front view of detail view 7A of FIG. 4, enlarged for clarity, illustrating a preferred layout of the tubular-shaped membranes of the water-vapor removal module of FIG. 2.

FIG. 7B shows a partial front view of detail view 7B of FIG. 7, enlarged for clarity, illustrating a preferred layout of tubular-shaped membranes of the water-vapor removal module of FIG. 2.

FIG. 8 shows a diagrammatic sectional view of a structural support pin of the tubular-shaped membranes of the water-vapor removal module of FIG. 2.

DETAILED DESCRIPTION OF THE BEST MODES AND PREFERRED EMBODIMENTS OF THE INVENTION

Figure 1:
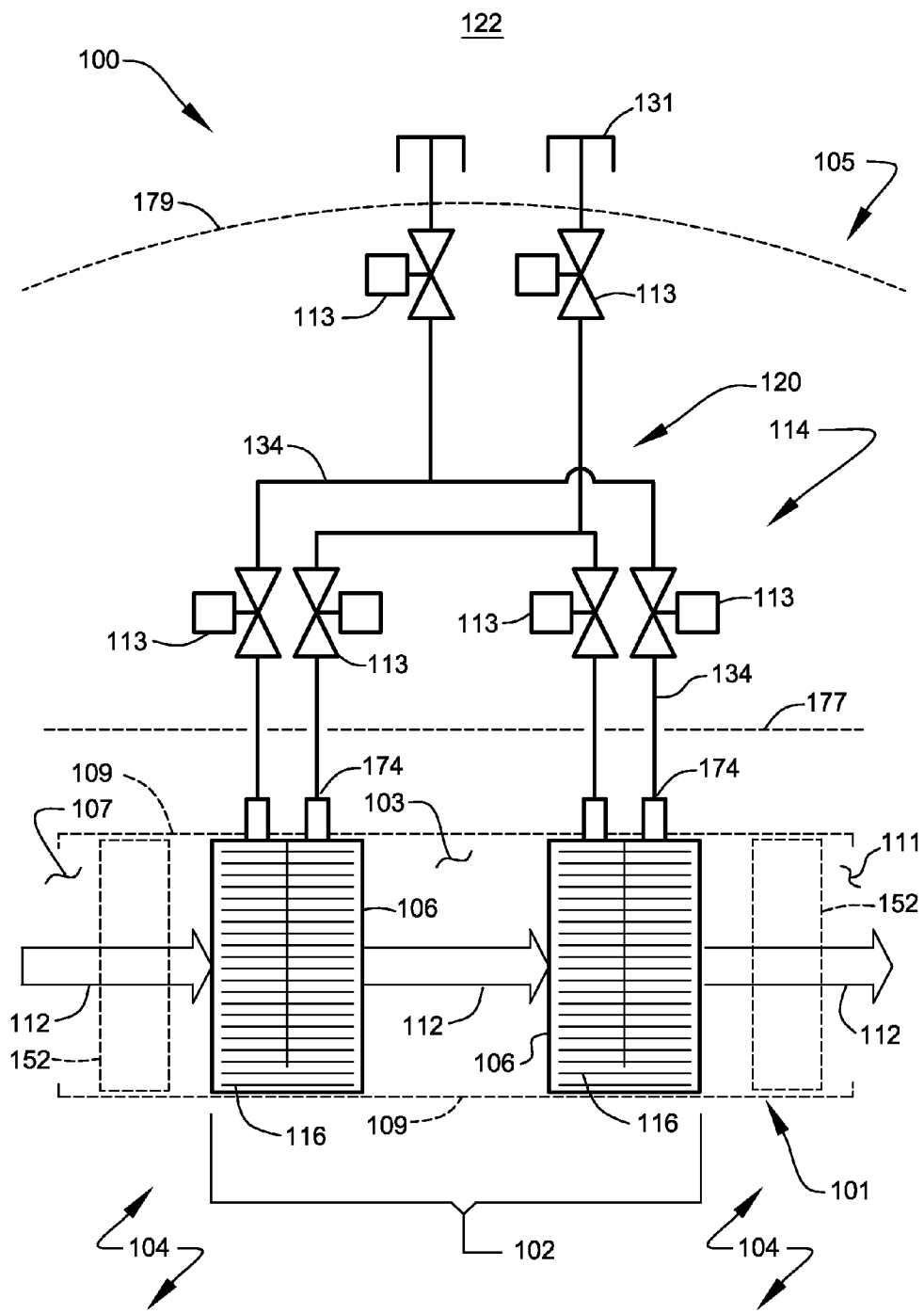
FIG. 1 shows a schematic diagram, illustrating a humidity control subsystem that preferably assists in removing metabolic water vapor from a habitable spacecraft environment, according to a preferred embodiment of the present invention.

FIG. 1 shows a schematic diagram illustrating Humidity Control Subsystem (hereinafter referred to as HCS 102) that preferably assists in removing metabolic water vapor from a habitable enclosed environment 104 of spacecraft 105, according to a preferred embodiment of the present invention. HCS 102 is a preferred component integrated within a larger spacecraft-air revitalization unit 101 of spacecraft-air revitalization system 100, which preferably provides at least the following life support functions:

1. Carbon dioxide control and removal
2. Atmospheric humidity control and removal
3. Trace contaminant control
4. Post-fire atmosphere recovery
5. Airborne particulate filtration
6. Primary cabin air circulation
7. Air cooling.

The purpose of spacecraft-air revitalization system 100 is preferably to incorporate the above-noted essential life-support functions into a unified component package that can preferably be integrated into many contemplated transport vehicles designed to move crew and cargo between earth and space. It should be noted that preferred embodiments of the present invention are focused particularly on atmospheric humidity control and removal.

The central function of HCS 102 is preferably to remove the metabolic water generated by the crew and water evolved during the adsorption of carbon dioxide by lithium hydroxide (LiOH) during the mission. Approximate water source and production rates per crew member for a maximum crew of seven are shown below in Table 1. Quantities shown in Table 1 are in gallons per hour (g/hr).

TABLE 1

| Water production and removal rate. | | | | |
|---|---|---|---|---|
| SINGLE PERSON WATER PRODUCTION | | SEVEN PERSON CREW WATER PRODUCTION | | |
| Metabolic (g/hr) | Evolved from LiOH (g/hr) | Metabolic (g/hr) | Evolved from LiOH (g/hr) | Total Water Production Rate (g/hr) |
| 70.57 | 17.71 | 494 | 124 | 618 |

HCS 102 is preferably configured to assist the removal of water vapor from the breathable atmosphere within enclosed environment 107 of the habitable regions of the vehicle (at least embodying herein water-vapor-remover means for removing the metabolic water vapor from the at least one habitable spacecraft environment).

Spacecraft-air revitalization unit 101 is illustrated diagrammatically as a dashed line boundary containing HCS 102. A more detailed example of spacecraft-air revitalization unit 101 is presented in FIG. 10. Referring to the diagram of FIG. 1, spacecraft-air revitalization unit 101 is preferably configured to divert a portion of the breathable atmosphere of the enclosed environment 107 to form airflow 112. Airflow 112 is preferably passed through the operable subcomponents of HCS 102 wherein water vapor is removed from airflow 112. As depicted in FIG. 1, HCS 102 is preferably located within air-conduction pathway 103 of spacecraft-air revitalization unit 101.

Spacecraft-air revitalization unit 101 preferably comprises at least one air inlet 107 to inlet airflow 112, at least one air outlet 111, and a substantially enclosed containment wall 109 extending between air inlet 107 and air outlet 111 to contain airflow 112 during movement through air-conduction pathway 103, as shown. In basic terms, the preferred embodiments of the system are preferably structured and arranged so that at least one portion of containment wall 109 is selectively permeable to water vapor. More specifically, at least one portion of containment wall 109 preferably comprises a region of chemically-selective permeation structured and arranged to selectively pass water vapor based on chemical affinity (at least embodying herein at least one chemically-selective passage structured and arranged to provide selective passage of the water vapor based on chemical affinity and at least embodying herein chemically-selective-passage means for allowing the selective passage of the metabolic water vapor based on chemical affinity). More specifically, at least one portion of containment wall 109 preferably comprises a chemically-selective membrane 116 having the property of selective passage of water vapor based on chemical affinity for water (at least embodying herein wherein at least one portion of such at least one containment wall comprises at least one chemically-selective membrane and wherein such at least one chemically-selective membrane comprises such at least one chemically-selective passage). This membrane allows water vapor to be removed from airflow 112 during conduction through air-conduction pathway 103 with negligible loss of other constituent gasses. In the preferred embodiments of the present invention, such chemically-selective membrane 116 is preferably located within HCS 102, which forms a preferred subcomponent of spacecraft-air revitalization unit 101.

Such chemically-selective membrane 116 preferably comprises at least one sulfonated perfluorinated ionomer. More specifically, such chemically-selective membrane preferably comprise at least one copolymer of perfluoro-3,6-dioxa-4-methyl-7octene-sulfonic acid and tetrafluoroethylene (Teflon®). In simpler terms, Nafion® contains a Teflon backbone with occasional side chains added of another fluorocarbon. The fluorocarbon side chain terminates in a sulfonic acid (—SO3H). One preferred form of this material is supplied by E.I. du Pont de Nemours and Company of Wilmington, Del. under the trade name Nafion®.

The preferred Nafion®-based chemically-selective membrane 116 is not a conventional micro-porous material and does not remove gases based on molecular size. Instead, the preferred Nafion®-based membrane removes gases based on their chemical affinity for sulfuric acid. Nafion® is predominantly Teflon® with sulfuric (sulfonic) acid groups interspersed within it. Sulfuric acid has a very high affinity for water. The sulfonic acid groups within the Nafion® material form ionic channels through the hydrophobic Teflon® polymer, and water is very readily transported through these channels. Thus, Nafion® functions as a highly selective, semipermeable membrane to water vapor.

With the exception of the sulfonic acid groups, all of chemically-selective membrane 116 is preferably a fluorocarbon polymer. Like most fluoropolymers, it is chemically inert. The sulfonic acid groups within the material are preferably immobilized within the bulk fluorocarbon matrix and cannot be removed, but unlike the fluorocarbon matrix, the sulfonic acid groups do not participate in chemical reactions. It is noted that the preferred presence of sulfonic acid makes chemically-selective membrane 116 selectively permeable to other compounds that bind to sulfonic acid. In addition to water, chemically-selective membrane 116 directly removes alcohols, ammonia, amines, and other compounds that possess a hydroxyl group or convert to one under acid catalysis. Some compounds are not removed but are rendered unrecognizable by acid catalysis. Inorganic compounds in general are not removed (other than water and ammonia).

Compounds that bind to the sulfonic acid in Nafion® will readily permeate through chemically-selective membrane 116. These compounds are limited essentially to gases that function as bases (in an acid-base reaction). Not all but most bases contain a hydroxyl group (—OH). For this reason, Water (H—OH) and Alcohols (R—OH where R is any general organic group) are all actively removed by Nafion®. Ammonia (forms ammonium hydroxide complex with water, NH3+H2O=NH2-OH). Primary amines (R—NH2) and secondary amines (R1, R2-NH) are removed by the same mechanism as ammonia.

Preferably, chemically-selective membrane 116 functions as an acid catalyst due to the strong acid properties of the sulfonic acid group within the Nafion®. As a strong acid catalyst, Nafion® converts organic compounds susceptible to acid catalysis into other compounds. Strictly speaking the compound is not removed from airflow 112, but it is converted into another compound instead. Acid catalysis occurs with compounds that have double or triple bonds between carbon atoms or between carbon and other atoms or that exhibit steric stress in the molecule (structural stress that can be relieved by reorganization of the molecule).

Organic compounds that have single bonds between the carbon are described as simple hydrocarbons, or alkanes (methane, ethane, propane, butane, pentane, hexane, heptane, octane, etc.). These compounds do not undergo acid catalysis and are not removed. Organic compounds that have double bonds between the carbons are called alkenes (ethylene, propylene, butylene, etc.). Compounds that have triple bonds between the carbons are called alkynes. Both alkenes and alkynes undergo acid catalysis and may be transformed, depending upon the specifics of the compound.

By a combination of the above-noted methods, Nafion® converts a compound into an alcohol and then removes it. Many organic compounds contain a carbonyl group (—C=O). This group will undergo acid catalysis to form an alcohol. In this reaction the carbon doubly bonded to oxygen combines with water to form a diol, a carbon with two hydroxyl groups attached (C=O+H2O yields HO—C—OH). Aldehydes, ketones, and organic acids all contain a carbonyl group. All are removed by Nafion® after undergoing such acid-catalyzed enolization. These compounds are not merely converted into another compound, but actually permeate through the Nafion® after converting into an alcohol. Since the compounds removed by this process must first undergo acid-catalyzed enolization, the rate of removal of the compound depends upon how easily it will undergo acid catalysis. This depends upon the nature of the organic group R attached to the carbonyl group. For example, formaldehyde has only a hydrogen in the R group position. Since the hydrogen will not readily accept charge sharing, formaldehyde resists acid-catalyzed enolization, and essentially no formaldehyde is removed by Nafion® from a gas sample. Benzaldehyde, on the other hand, has a benzene ring in the R position. A benzene ring will very readily accept charge sharing, so benzaldehyde undergoes acid-catalyzed enolization and subsequent removal by Nafion®. Other organic compounds that have double or triple bonds between carbon and another atom (oxygen or nitrogen) may also undergo acid catalysis and subsequent removal. Nitriles are an example of compounds with a multiple bond between carbon and nitrogen that are removed by Nafion®. Dimethyl sulfoxide (DSMO) and tetrahydrofuran (THF) are two examples of other compounds that are also removed by chemically-selective membrane 116.

As generally illustrated in FIG. 1, chemically-selective membrane 116 is preferably integrated within water-vapor removal modules 106, more preferably, two independent water-vapor removal modules 106 with each module preferably located in communication with airflow 112 within air-conduction pathway 103, as shown. Preferably, the water-vapor removal modules 106 of HCS 102 are arranged in series with respect to airflow 112, as shown. Upon reading this specification, those with ordinary skill in the art will now appreciate that, under appropriate circumstances, considering such issues as design preference, cost, performance requirements, available materials, technological advances, etc., other module arrangements such as, for example, parallel configurations, etc., may suffice.

Each water-vapor removal module 106 is preferably designed to promote surface interaction between chemically-selective membrane 116 and airflow 112. More specifically, each water-vapor removal module 106 is preferably designed to maximize the surface area of chemically-selective membrane 116 available to airflow 112 during movement through air-conduction pathway 103. In that regard, chemically-selective membrane 116 preferably divided into a plurality of tubular-shaped membranes 121, as generally illustrated in FIG. 2 and FIG. 3.

Figure 2:
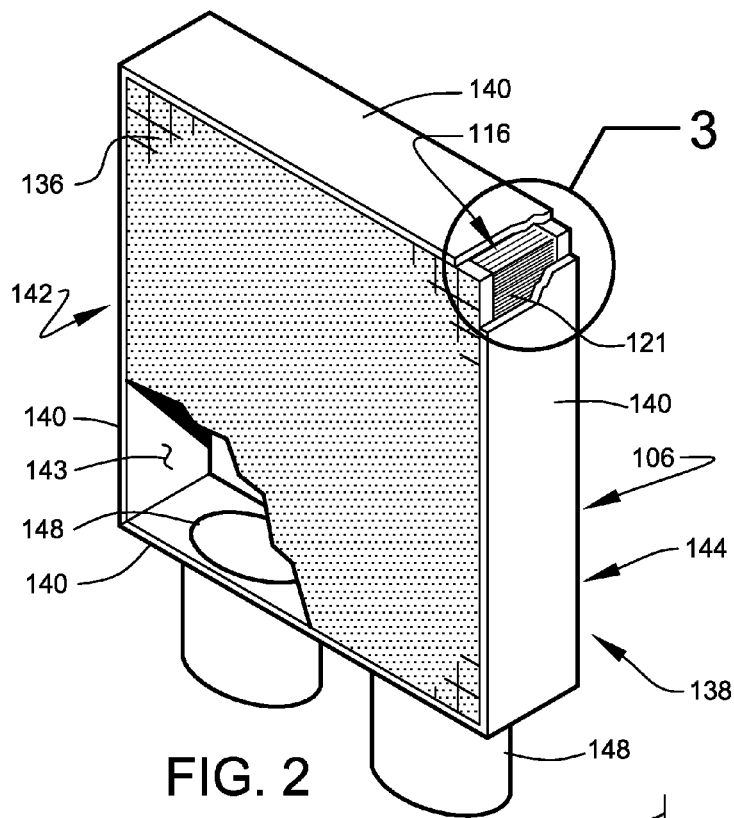
FIG. 2 shows perspective view, illustrating a water-vapor removal module of the humidity control subsystem, according to the preferred embodiment of FIG. 1.
Figure 3:
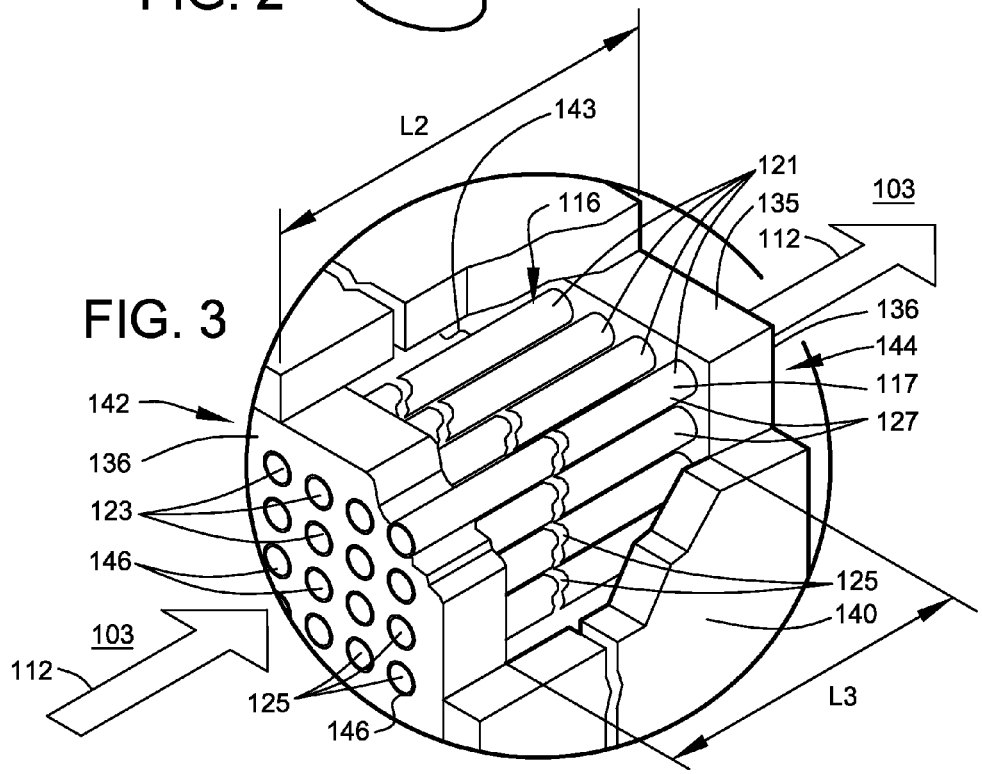
FIG. 3 shows perspective view, in partial section, illustrating a portion of the water-vapor removal module of FIG. 2, according to the preferred embodiment of FIG. 1.

FIG. 2 shows perspective view, illustrating water-vapor removal module 106 of HCS 102, according to the preferred embodiment of FIG. 1. FIG. 3 shows an enlarged perspective view, in partial section, illustrating a portion of water-vapor removal module 106 of FIG. 2. Reference is now made to FIG. 2 and FIG. 3 with continued reference to the illustrations of FIG. 1. It should be noted that, for clarity, the diameter of the illustrated tubular-shaped membranes 121 of FIG. 3 are shown at an enlarged scale relative to the adjacent components.

Each water-vapor removal module 106 preferably comprises a modular housing 138 having four mutually perpendicular side walls 140 that preferably define a forward opening 142, an opposing rear opening 144, and interior region 143, as shown. Both forward opening 142 and rear opening 144 are preferably configured to inlet and discharge airflow 112 moving within air-conduction pathway 103, as shown in FIG. 3.

Each tubular-shaped membrane 121 preferably comprises a membrane wall 117 formed into a hollow tube, as shown. As shown in FIG. 3 and FIG. 7A, each water-vapor removal module 106 is preferably composed of bundles of tubular-shaped membranes 121. The tubular-shaped membranes 121 are preferably arranged in parallel orientation such that airflow 112 passes through the interior bores 123 of the tubular membranes, and during such passage, contacts the inner membrane surfaces 125. The outer membrane surfaces 127 of the tubular-shaped membranes 121 are preferably exposed to an atmosphere within interior region 143 having a water-vapor partial pressure less than that of airflow 112, as will be further described below. One source of such tubular-shaped membrane 121 is Perma Pure LLC of Toms River, N.J.

Referring again to FIG. 1, HCS 102 preferably comprises at least one transport driver 114 to drive the transport of the water vapor across the chemically-selective membranes 116 (at least embodying herein transport-driver means for driving transport of the metabolic water vapor across such chemically-selective passage means). The transport of water vapor through the Nafion®-based chemically-selective membrane 116 is driven, effectively, by a difference in water vapor partial pressure across membrane wall 117. To enable such transport within HCS 102, each transport-driver 114 preferably provides a means for exposing the outer membrane surfaces 127 of chemically-selective membrane 116 to an atmosphere having a water-vapor partial pressure less than that of airflow 112 (at least embodying herein water-vapor-partial-pressure-differential provider means for providing at least one water-vapor-partial-pressure differential across such chemically-selective passage means and wherein such at least one transport-driver comprises at least one water-vapor-partial-pressure-differential provider structured and arranged to provide at least one water-vapor-partial-pressure differential across such at least one chemically-selective passage).

More preferably, (see FIG. 1) the transport driver 114 of HCS 102 comprises at least one exposure pathway 120 configured to expose outer surface 127 of chemically-selective membrane 116 to the ambient environment 122 beyond the enclosed habitable environment boundary 177 of spacecraft 105 (at least embodying herein wherein such at least one water-vapor-partial-pressure-differential provider comprises exposure means for exposing such chemically-selective-passage means to at least one ambient flight environment external of the at least one habitable spacecraft environment). As diagrammatically illustrated in FIG. 3, the system is preferably arranged to place housing interior 143 in fluid communication with exposure pathway 120.

In this preferred arrangement, water vapor is selectively purged from airflow 112 through chemically-selective membrane 116 to ambient environment 122 when the water-vapor partial pressure of ambient environment 122 is less than that of airflow 112 (at least embodying herein wherein such chemically-selective-passage means selectively removes the metabolic water vapor from the at least one airflow when at least one water-vapor partial pressure of the at least one ambient flight environment is less than that of the at least one airflow). For example, during a space mission, the ambient environment 122 surrounding spacecraft 105 comprises a near vacuum when above certain operational altitudes, which readily drives the transport of water vapor across the chemically-selective membranes 116.

In a preferred arrangement of the present system, exposure pathway 120 comprises an arrangement of fluid-conducting vacuum vent lines 134 preferably configured to couple water-vapor removal modules 106 with the external ambient environment 122, as shown. More preferably, the preferred distribution of vacuum vent lines 134 provides each water-vapor removal module 106 with at least two independent fluid-conducting pathways coupling the modules with the external ambient environment 122, as shown. Vacuum vent lines 134 preferably terminate at a set of external vent ports 131 preferably located at or near the outer mold line 179 of the vehicle or other containment boundary of the habitable environment, as shown.

Since water recovery is not critical for the short-duration missions, space vacuum is most preferably used to create the necessary vapor pressure differential across the chemically-selective membranes 116 (at least embodying herein at least one water-vapor partial pressure of the at least one ambient environment less than that of the at least one airflow). This preferred arrangement preferably provides an essentially "no-moving-parts" water removal subsystem.

During operation, water vapor within the passing airflow 112 is absorbed at inner membrane surface 125 of tubular-shaped membrane 121, then perevaporated into the surrounding ambient vacuum or a dry purge gas within housing interior 143. During short-duration missions (about five days or less), both water-vapor removal modules 106 will preferably remain open to the ambient outer environment for the full duration of the mission and only isolated from the ambient environment if there is a failure or when the system is shut down while docked.

Figure 9:
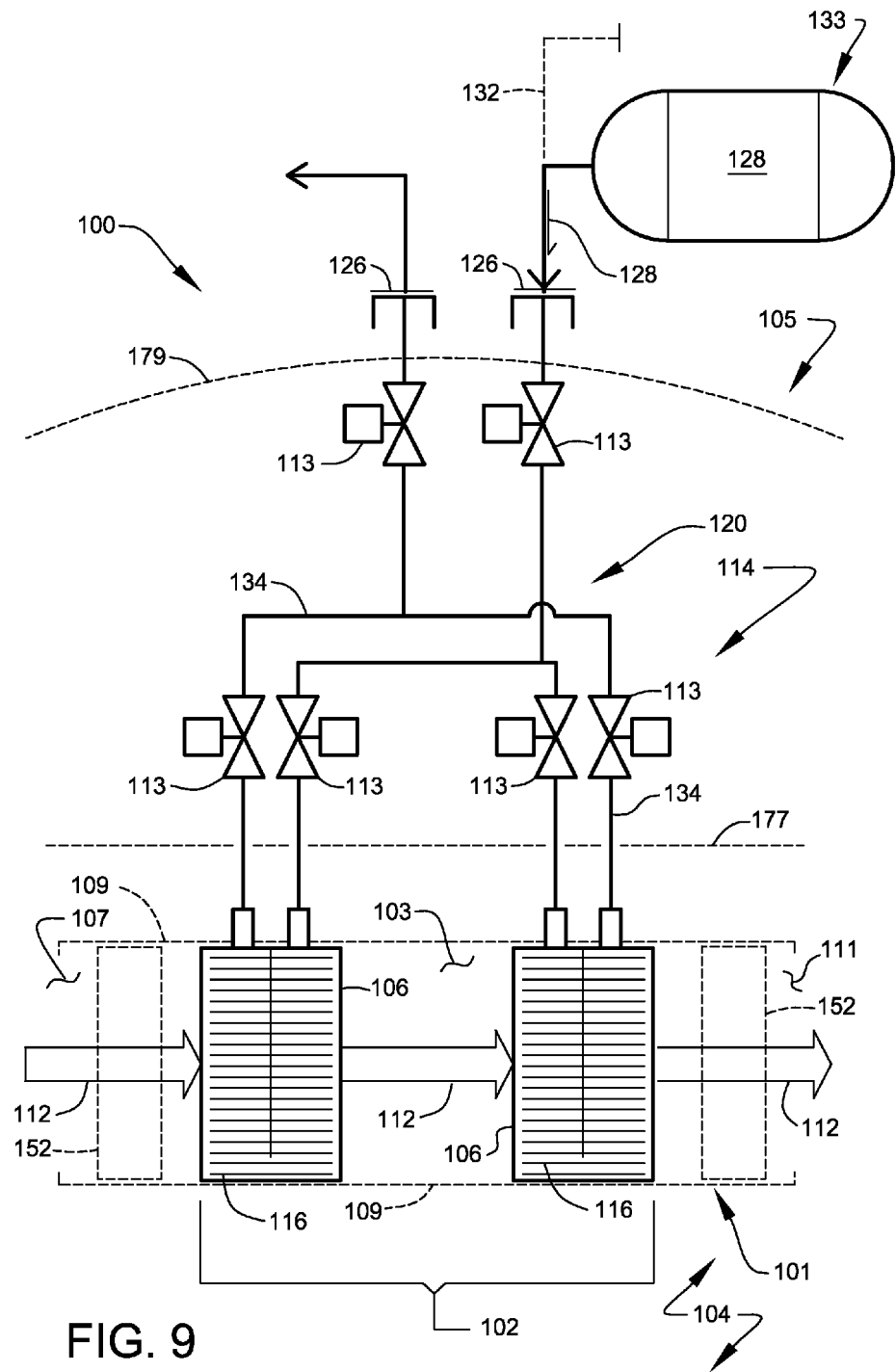
FIG. 9 shows a schematic diagram, illustrating preferred arrangements of the humidity control subsystem during ground operations, according to a preferred embodiment of the present invention.

Fluid flow within exposure pathways 120 is preferably controlled by an arrangement of valves 113 preferably incorporated within vacuum vent lines 134 to allow for purging of the modules with a dry gas 128 prior to launch (see also FIG. 9). A set of dry-gas coupler 126 are preferably provided to allow coupling of the exposure pathways 120 with at least one ground-based dry-gas source 133 supplying dry gas 128. Valves 113 are preferably configured to create a circulating pathway for the dry gas to enter the modules through one dry-gas coupler 126 and exit out the other dry-gas coupler 126. Dry gases 128 suitable for such ground-based purge operations preferably include inert gases such as nitrogen.

As an operational safety measure, valves 113 are preferably arranged so that either of the water-vapor removal modules 106 can be isolated from the exposure pathways and removed from operation in the event of failure (at least embodying herein at least one selectable isolator structured and arranged to selectably isolate at least one of such at least one first such at least one water-vapor removal module and such at least one second such at least one water-vapor removal module from such at least one exposure pathway). Valve selection is based, in part, on system performance requirements and may preferably comprise, for example, 2-way units with a manual override. Upon reading this specification, those with ordinary skill in the art will now appreciate that, under appropriate circumstances, considering such issues as design preference, user preferences, vehicle configuration, cost, operational requirements, available materials, technological advances, etc., other valve arrangements such as, for example, the use of overpressure safety valves, sensor-based controls, additional redundant circuits, etc., may suffice.

For illustrative purposes, the following descriptions will include reference to a projected mission transporting a crew of seven humans between earth and low earth orbit (LEO). Such a hypothetical transport mission is provided to further illustrate the preferred in-service operation and operable configuration of HCS 102. The parameters of such a proposed mission preferably include the support of the seven crewmembers during a five-day flight.

Figure 4:
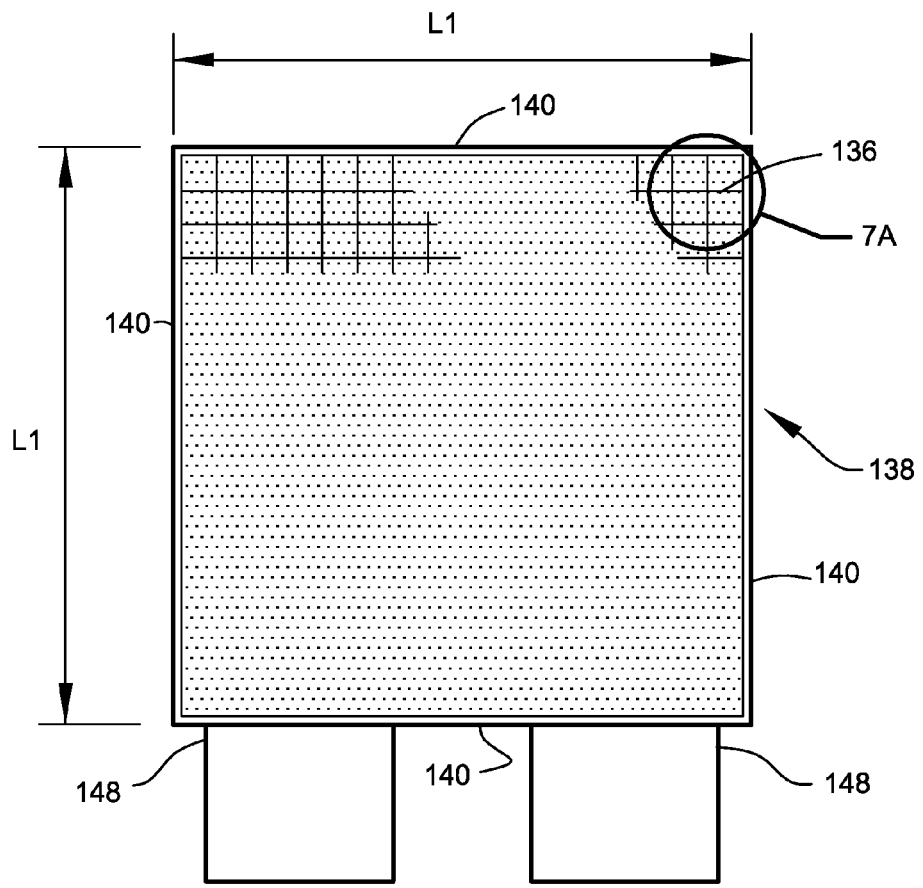
FIG. 4 shows a front view, illustrating the water-vapor removal module of FIG. 2.
Figure 6:
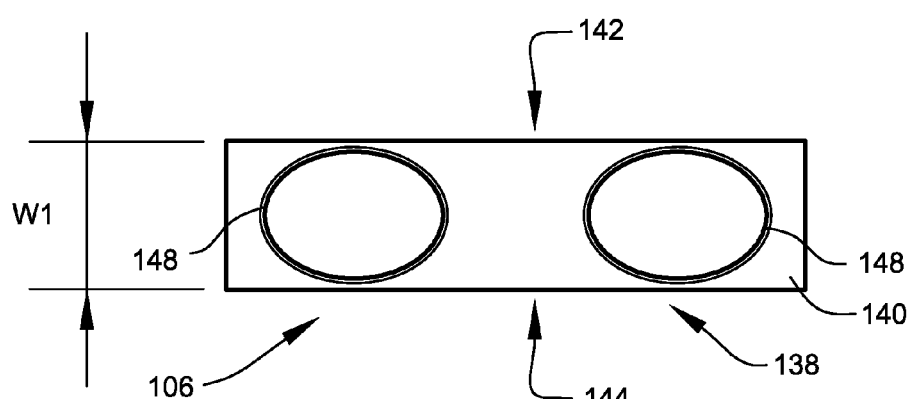
FIG. 6 shows a top view, illustrating the water-vapor removal module of FIG. 2.

FIG. 4 shows a front view, illustrating water-vapor removal module 106 of FIG. 2. FIG. 5 shows a side view, illustrating water-vapor removal module 106 of FIG. 2. FIG. 6 shows a top view, illustrating water-vapor removal module 106 of FIG. 2.

In the preferred embodiment shown in FIG. 4 through FIG. 6, each side wall 140 preferably comprises a preferred length L1 of about 17 inches and a preferred width W1 of about 4.2 inches (at least embodying herein wherein such at least one length is greater than such at least one width).

Inlet opening 142 and outlet opening 144 each comprise an approximately square format of about 16½ inches by about 16½ inches providing a preferred open frontal area of about 272 in$^2$ (square inches). It should be noted that the preferred embodiments of the system described herein are preferably designed to be scalable and may comprise alternate size formats in response to factor such as crew size, mission duration, etc. Furthermore, upon reading this specification, those with ordinary skill in the art will now appreciate that, under appropriate circumstances, considering such issues as design preference, application, cost, structural requirements, available materials, technological advances, etc., other shape geometries such as, for example, cylindrical, rectangular, triangular, pentagonal, octagonal, etc., may suffice.

To support the water vapor removal loads suggested in Table 1, each module preferably houses between about 17,500 and about 28,000 tubular-shaped membranes 121. The tubes are preferably located within interior region 143 and are preferably oriented to place the two open ends 146 of tubular-shaped membranes 121 at about the forward opening 142 and rear opening 144 respectively (see also FIG. 3 and FIG. 7A). This preferred size format permits a maximum of about one-hundred three tubes to be placed per square inch while allowing sufficient space around the individual tubular-shaped membranes 121 to permit exposure of the outer surfaces 127 of the tubular-shaped membranes 121 to the vacuum or dry gas within housing interior 143.

FIG. 7A shows a partial front view of detail view 7A of FIG. 4, enlarged for clarity, illustrating a preferred layout of tubular-shaped membranes 121 of water-vapor removal module 106 of FIG. 2. FIG. 7B shows a partial front view of detail view 7B of FIG. 7A, enlarged for clarity, illustrating a preferred layout of tubular-shaped membranes 121 of the water-vapor removal module 106. Tubular-shaped membranes 121 are preferably packaged into groupings consisting of approximately one-hundred tubes per bundle. The preferred tube to tube spacing S1 is about 0.094 inch. The ends of the tubular-shaped membranes 121 of a single bundle are preferably fixed within a respective tube-holding face member 136 by embedment within potting epoxy 135, as shown. The preferred tubular-shaped membrane 121 comprises a preferred inner diameter D1 of about 0.038 inch and a preferred outer diameter D2 of about 0.042 inch. Each tubular-shaped membrane 121 preferably comprises a total tube length L2 of about 4.2 inches (see FIG. 3). Embedment of the tube ends within epoxy 135 yields an effective tube length L3 of about 3.2 inches, which represents the length of tubular-shaped membrane 121 available to exposure to the vacuum or gas supplied through exposure pathway 120 to housing interior 143. The corresponding total effective (vacuum exposed) surface area of outer membrane surfaces 127 is thus approximately 12,000 in$^2$ (about 7.6 m$^2$).

Through experimental testing, applicant selected a quadrilateral tube placement preferably employing a regular rectilinear layout of tubular-shaped membranes 121 as generally shown in FIG. 7A. This preferred design geometry was selected as the preferred baseline for future system embodiments based upon the fact that adequate tube spacing could be achieved without exotic geometry and the required time and complexity for manufacturing is anticipated to be lower than that for alternate designs. Upon reading this specification, those with ordinary skill in the art will now appreciate that, under appropriate circumstances, considering such issues as design preference, mission requirements, vehicle requirements, available materials, technological advances, etc., other tube geometrical arrangements such as, for example, tubes of each bundle terminating in potting epoxy in a pattern of concentric rings wherein the tubes bow outwards radially to improve exposure to vacuum, etc., may suffice.

Each bundle preferably consists of about a 10 tubular-shaped membranes 121 by 10 tubular-shaped membranes 121 grid of tubular-shaped membranes 121, as shown. This preferred packing density is preferably used to reduce the risk of stalling mass transfer rates at the core of the modules. Alternately preferably to 100 tubes, however not required, an additional three tubes (totaling 103) may be placed between the bundles. The above-described arrangement of the tubes is preferably accomplished using at least one fixture 180 that can be immersed within epoxy 135, as generally illustrated in FIG. 7B.

At least one of the four side walls 140 of housing 138 preferably comprises a set of vacuum vent access ports 148, as shown. Vacuum vent access ports 148 are preferably provided as a means for establishing fluid connections between housing interior 143 and vacuum vent lines 134 of exposure pathway 120. More preferably, one sidewall 140 of housing 138 preferably comprises two vacuum vent access ports 148 preferably configured to enable fluid interaction between exposure pathway 120 and the plurality of tubular-shaped membranes 121 located within housing interior 143. The use of two vacuum vent access ports 148 enables the circulation of dry gas 128 through the module during ground operation, as generally illustrated in FIG. 9. Upon reading this specification, those with ordinary skill in the art will now appreciate that, under appropriate circumstances, considering such issues as design preference, user preferences, operational preferences, cost, structural requirements, available materials, technological advances, etc., other physical arrangements such as, for example, providing one or more internal baffles inside the module to ensure that the dry purge gas flows over all outer membrane surfaces of the chemically-selective membrane, etc., may suffice.

FIG. 9 shows a schematic diagram illustrating the preferred arrangements of HCS 102 during ground operations, according to a preferred embodiment of the present invention.

To dry airflow 112 on the ground, exposure pathway 120 is preferably configured to enable coupling of HCS 102 to either a ground-based vacuum source 132 or a dry gas purge (preferably dry-gas source 133 preferably delivering air or alternate preferred dry gas). Due to the relative ease in implementation, HCS 102 preferably uses a dry (−40° C. dew point) nitrogen gas during the ground operations and up until launch. The preferred nitrogen purge gas produces the difference in vapor pressure required to draw the water from airflow 112.

Data provided by the manufacturer of the Nafion®-based tubular-shaped membranes 121 (PermaPure LLC) suggested the use of a purge gas flow rate of between about two to three times that of the gas being dried. Due to the non-standard arrangements of the present system embodiments, calculations were performed by applicant to determine the actual amount of purge gas required to keep the water partial pressure at or below a preferred 0.05 pound per square inch. While the manufacturer suggested rate was between about 60-90 scfm for 30 scfm of moist gas airflow, applicant's test returned an unexpected and atypical flow rate requirement of about 110 standard cubic feet per minute (scfm). Based on this information, the initial requirement for nitrogen purge gas was preferably set at about 90 scfm prior to launch, or a mass flow rate of about 2.97 kilograms per minute.

FIG. 9 provides a diagrammatic representation of how dry-gas coupler(s) 126 feed dry gas 128 into one of the two vacuum vent lines 134 of exposure pathway 120. Valves 113 are preferably configured to create a circulating pathway for dry gas 128 to enter the modules through one dry-gas coupler 126 and exit out the other dry-gas coupler 126 for recovery or discharge, as shown. Upon reading this specification, those with ordinary skill in the art will now appreciate that, under appropriate circumstances, considering such issues as design preference, user preferences, cost, vehicle requirements, available materials, technological advances, etc., other control arrangements such as, for example, additional redundant circuits, alternate valve arrangements, automatic emergency actuators/sensors, etc., may suffice.

Spacecraft 105 is preferably decoupled from dry-gas source 133 prior to launch. Preferably, after several minutes into launch, spacecraft 105 will have ascended to approximately 150,000 ft at which point the local atmospheric pressure is low enough to effect drying. Prior to reaching this altitude, HCS 102 may potentially operate at reduced efficiency due to the lack of water-vapor-partial-pressure differential across chemically-selective membrane 116. During about the first two minutes of ascent immediately following launch, the humidity in the cabin is anticipated to rise approximately 30 percent based on the water generation rate of about 618 g/hour for a crew of seven, a 550 cubic foot volume, and a constant temperature of 24° C. (75° F.). One preferred option is to pre-condition enclosed environment 104 to about 25 percent relative humidity prior to launch, resulting in a maximum cabin relative humidity of about 74 percent as spacecraft 105 achieves sufficient altitude to initiate the operation of water-vapor-partial-pressure-differential provider 118 using ambient environment 122. This level is within the acceptable limits for enclosed environment 104, but high enough that condensation may occur if chilled coolant used to control the temperature of airflow 112 is supplied at a nominal inlet temperature of 47 degrees Fahrenheit (° F.). For example, although chemically-selective membranes 116 of HCS 102 will not be running as efficiently below about 150,000 feet, the system will nonetheless remove some moisture (e.g., potential moisture retention in the membrane) which is believed by applicant to be sufficient to avoid condensation. The same issue will exist during decent, below 150,000 feet. Upon reading this specification, those with ordinary skill in the art will now appreciate that, under appropriate circumstances, considering such issues as design preference, crew preferences, mission parameters, cost, structural requirements, available materials, technological advances, etc., other moisture mitigation strategies such as, for example, confirming that small amounts of condensate will stay as a film on heat exchanging apparatus and eventually evaporate once the cabin humidity is decreased, catching the condensate with an additional absorbing material either in a condensate collection pan that will be used post landing or somewhere in the airflow, temporarily increasing coolant temperature during this short phase of the mission and increasing cabin air circulation rate to maintain heat removal, etc., may suffice.

Referring again to FIG. 3, it is helpful to recall that membrane walls 117 of the tubes also function as pressure walls separating enclosed environment 104 from space vacuum. The internal pressure of tubular-shaped membrane 121 is preferably maintained at a level greater than the external pressure within exposure pathway 120 to prevent structural collapse of the tubes. However, testing suggests that the preferred tubular-shaped geometry of the membranes exhibit sufficient mechanical strength to withstand an external pressure within exposure pathway 120 of about 5 inches of water (it should be noted that this mechanical performance is temperature dependent).

During decent, it is anticipated that the outer membrane surfaces 127 of tubular-shaped membrane 121 will experience up to about 0.5 pound-force per square inch absolute (psia) back pressure. This is not an issue under normal operational conditions since the internal pressure of tubular-shaped membrane 121 will preferably be maintained far above the negative-pressure failure point of about 5 inches of water. If cabin pressure within enclosed environment 104 is completely lost during decent, the tubes may collapse if the structural limits of the tubes are exceeded. This will most likely require refurbishment or replacement of water-vapor removal modules 106. Upon reading this specification, those with ordinary skill in the art will now appreciate that, under appropriate circumstances, considering such issues as design preference, cost, vehicle requirements, available materials, technological advances, etc., other mitigating arrangements such as, for example, providing a valve design triggered to close the exposure pathway if the cabin depressurizes, etc., may suffice.

FIG. 8 shows a diagrammatic sectional view of a structural support pin 137 of the tubular-shaped membranes of the water-vapor removal module of FIG. 2. Each tube-holding face member 136 of water-vapor removal module 106 must support nearly 4000 pounds (16.5 in.×16.5 in.×14.7 psi) of total pressure (before the safety margin). To resist this load, an arrangement of rigid support pins 137 is preferably placed between the opposing tube-holding face members 136, as shown. The preferred plurality of support pins 137 (at least embodying herein support columns) are preferably interspersed within the plurality of tubular passages. Support pins 137 are preferably distributed on one-inch centers and span between the opposing tube-holding face members 136. An initial structural analysis by applicant indicated that this preferred pin spacing limited the deflection of the tube-holding face members 136 to less than one thousandth of an inch under load.

Figure 10:
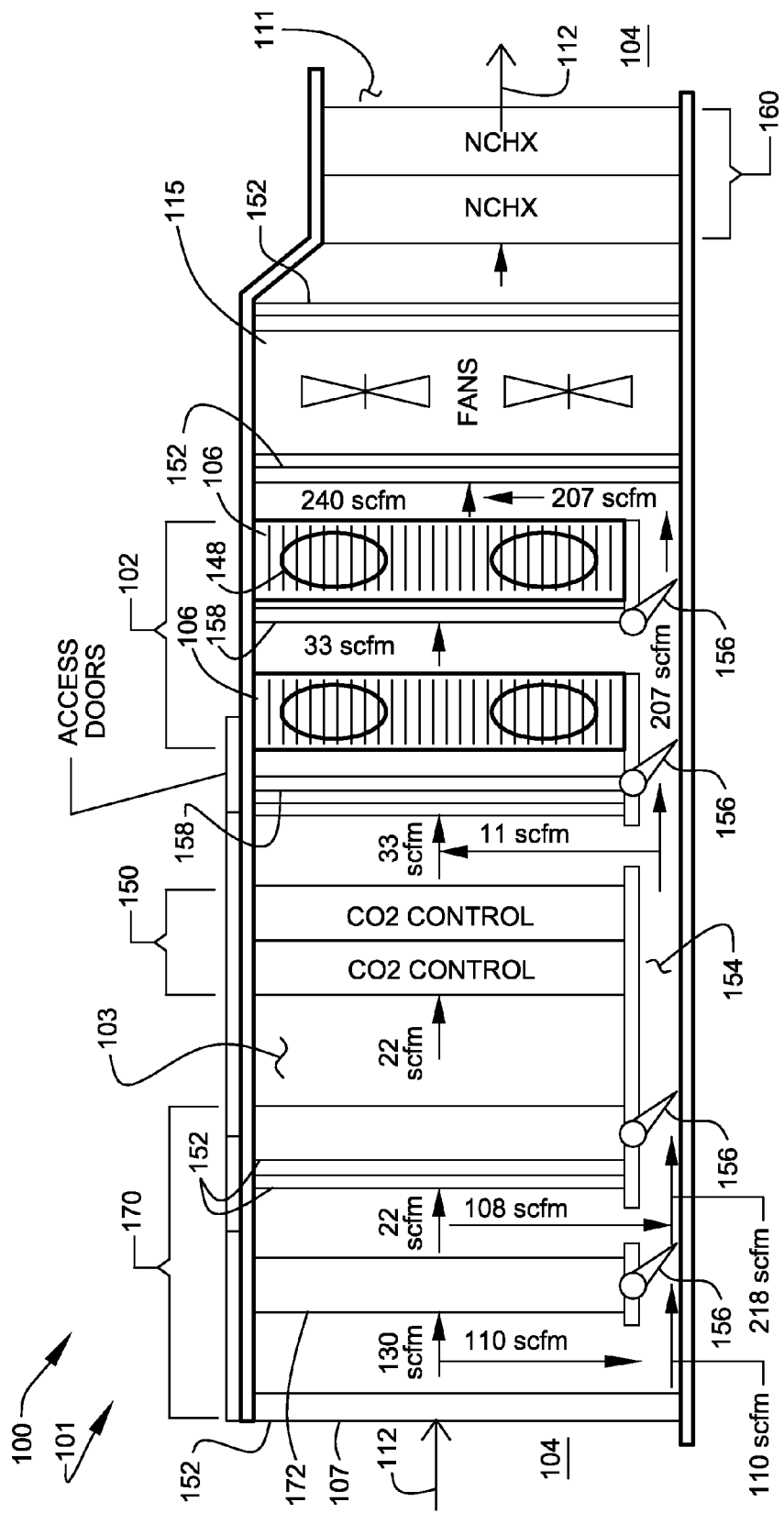
FIG. 10 shows an enhanced schematic diagram, illustrating the humidity control subsystem integrated within the modular spacecraft-air revitalization unit the of the overall spacecraft-air revitalization system, according to a preferred embodiment of the present invention.

FIG. 10 shows an enhanced schematic diagram illustrating HCS 102 integrated within modular spacecraft-air revitalization unit 101 of spacecraft-air revitalization system 100 according to a preferred embodiment of the present invention. FIG. 10 illustrates the preferred arrangements of HCS 102 and spacecraft-air revitalization unit 101 during normal flight operation. In addition to HCS 102, spacecraft-air revitalization unit 101 preferably comprises a carbon-dioxide control and removal section 150 and may preferably include additional air-revitalization components 152, such as, for example, trace contaminant control components, particulate filtration components, etc. At least one fan unit 115 is preferably provided within air-conduction pathway 103 to actively move airflow 112 between air inlet 107 and air outlet 111 (at least embodying herein at least one air movement generator). Each air-revitalization component is preferably located within air-conduction pathway 103 to allow interaction with airflow 112.

Air-conduction pathway 103 preferably comprises at least one air-bypass duct 154 preferably configured to controllably bypass portions of airflow 112 past the above-noted subcomponents of spacecraft-air revitalization unit 101. Air-bypass duct 154 preferably comprises a set of flow control vanes 156 preferably configured to control the volume of airflow 112 bypassing individual subcomponents of spacecraft-air revitalization unit 101.

Carbon-dioxide control and removal section 150 is preferably configured to adsorb $CO_2$ using a multi-step exothermic lithium hydroxide (LiOH) reaction. In addition to heat, two moles of water are liberated for each mole of $CO_2$ absorbed in carbon-dioxide control and removal section 150.

The preferred process of sizing HCS 102 for water removal begins with an understanding of water generation rates. As shown in Table 1 above, the water generation and hence removal rate for seven crew members is about 618 g/hr. Of this, 494 g/hr is produced directly from the crew and an additional 124 g/hr is a byproduct of the adsorption of $CO_2$ by LiOH within carbon dioxide control and removal section 150. HCS 102 has preferably been sized to remove water at this rate by processing about 33 cubic feet per minute (cfm) of 40 percent relative humidity air and reducing the Relative Humidity (RH) to about 5 percent at a temperature and pressure of 90° F. and 14.7 psia. At a cabin pressure of 11 psia, 618 grams per hour of water can be removed from 33 cfm and can be accomplished with an incoming RH of 40% and exit RH of 5% from the 33 cfm portion of the total ARS flow of over 200 cfm.

When considering the water production from the LiOH, maintaining the flow rate to HCS 102 at about 33 cfm would appear counter intuitive. Specifically, water production rate and flow rate calculations, based on the ideal gas law, suggest that the flow through HCS 102 should be increased to about 41 cfm in order to dry the proper volume of air required to maintain enclosed environment 104 at about 40% RH. However, the 618 g/hr of water does not come solely from metabolic production within enclosed environment 104. Only 494 g/hr is produced outside of spacecraft-air revitalization system 100, while 124 g/hr is produced from the LiOH and only present in about 22 cfm entering HCS 102. Therefore, the combined 33 cfm volume entering HCS 102 preferably contains a mixture of two flows with different dew points. HCS 102 designed preferably to maintain overall drying performance by self adjusting to utilize more of the available inner membrane surface 125 of the tubular-shaped membranes 121 of the modules. This preferred configuration is preferably results in improved performance since there will be a higher water vapor pressure differential from the inner membrane surface 125 (see FIG. 3) of chemically-selective membrane 116 to the outer membrane surfaces 127 exposed to vacuum.

As no test data relating to applicant's preferred system arrangements existed at the time of development, applicant modified several gas-to-gas Nafion®-based humidifiers to determine experimentally the general viability of applicant's conception. Specifically, applicant modified and tested FC-Series Nafion® gas humidifiers of FC600-7000 7PP design produced Perma Pure LLC of Toms River, N.J. These FC-Series Nafion® gas humidifiers where modified by applicant to function as both gas-to-gas moisture exchangers and gas-to-vacuum moisture exchangers. The FC600 7000 7PP design houses a plurality of Nafion® tubes inside a 6-inch inside diameter poly vinyl chloride (PVC) shell that accommodates the vacuum or purge gas. The test units contained approximately 5800 $in^2$ of membrane surface area (or approximately 175 $in^2$/cfm) and a packing density (total cross sectional area of tubes to cross sectional area of shell) of about 34%.

Although the modified Nafion® gas humidifiers proved unsuitable for use within spacecraft-air revitalization system 100, usable testing data was generated by applicant's experimental testing. For example, at the preferred flow rates proposed, the pressure drop within the test configuration was determined to be greater than acceptable for most applications. Based on physical testing of the experimental units, applicant calculated that the theoretical or optimal rate of water removal of applicant's preferred quadrilateral configuration to be about 0.22 moles/$m^2$/second. Applicant was also able to determine that the pressure drop across HCS 102 is within useful design parameters.

As shown in FIG. 10, HCS 102 preferably consists of two separate water-vapor removal modules 106. Each unit preferably includes protective screen 158, as shown. The head loss for a single screen 158 is about 0.08 inches of water. The total head loss across HCS 102 can preferably be determined in two ways. Extrapolation of the pressure drop data derived from the test units yields an approximate pressure drop of 0.12 inches of water. This pressure drop is confirmed preferably using the basic hydraulic formula for laminar flow. Specifically, given air volume flow per tubular-shaped membrane 121 of about 0.001 cubic feet/minute; gas weight density of about 1.2 kg/$m^3$; kinematic viscosity of about $12 \times 10^{-6}$ $m^2$/s; circular inner diameter D1 of about 0.038 in.; effective tube length L3 of about 0.35 ft.; velocity of flow of about 0.65 m/s; Reynolds number of 52; assumed laminar flow; assumed absolute roughness of about 0.1 mm; pipe friction number of about 1.23; and resistance coefficient of about 136.35; the resulting total calculated pressure drop equals about 0.14 inches of water.

For design purposes, about a 0.1 inch pressure drop allowance is preferably provided in the calculations; thus, the total pressure drop for the HCS 102 is about 0.64 inches of water. This preferred pressure drop allowance for a reduction in the total number of tubular-shaped membranes 121 from the upper preferred 28,000 tube to 17,500 tubes in the event that even greater tube-to-tube spacing is preferred in water-vapor removal modules 106 for vacuum access.

In the preferred embodiment configuration, tubular-shaped membranes 121 were preferably sized to remove most of the water vapor in the first half of the inner membrane surface 125 with about a 90-percent margin. The volumetric flow rate of air through HCS 102 was preferably sized to yield a dry-air flow rate to bypass-flow rate ratio that would preferably prevent condensation at the downstream heat exchanger 160. The relative humidity just upstream of the heat exchanger 160 (% RHMIXED) can be illustrated by the following equation, where QHCS is the volumetric flow rate of HCS 102, QSYS is the total volumetric flow rate, and % RHSYS is the dryer inlet relative humidity.

$$\% RH_{MIXED} = \% RH_{SYS} * \left(1 - \left(\frac{Q_{HCS}}{Q_{SYS}}\right)\right) \quad \text{Equation 1}$$

Exercising the above equation 1 results in a preferred airflow rate of about 33 cfm through HCS 102 and about 207 cfm through air-bypass duct 154. The corresponding dew-point temperature, consistent with the relative humidity and temperature, is preferably maintained just above the anticipated 47° F. coolant temperature of the heat exchanger 160. In the case of an emergency, HCS 102 is preferably designed to handle higher volumetric flow rates if they are necessary to keep heat exchanger 160 from condensing.

HCS 102 is preferably sized for a specific water-vapor removal load, which in the present preferred embodiment, corresponds to a proposed crew of seven persons. It is important to note that since the performance of chemically-selective membrane 116 increases as the water vapor pressure differential across the membranes increases and the water transfer rate will decrease as HCS 102 experiences a water vapor mass lower the unit's rejection capacity. The benefit derived from this preferred behavior is that HCS 102 passively reduces the rate of water removal when the percent relative humidity (% RH) in enclosed environment 104 falls below the % RH operational requirements for which HCS 102 has been sized, as the water vapor pressure differential decreases correspondingly. Therefore, HCS 102 is preferably configured to prevent complete dehumidification of enclosed environment 104 so long as there is a moisture source in the cabin.

During periods of low crew activity, such as sleep times, fan section 115 is preferably configured to be adjustable to operate at a lower setting, thereby reducing the volume of airflow through HCS 102 and thus the amount of water removed from enclosed environment 104. If a higher than expected amount of water is produced within enclosed environment 104, HCS 102 is preferably configured to utilize additional portions of inner membrane surfaces 125 to support the drying of airflow 112 (further down interior bores 123 of the tubes), as previously noted.

In space flight, operating in an atmosphere of 14.7 psia is not always possible. In certain spacecraft applications, the atmospheric pressure may differ slightly from the nominal 14.7 psia on earth. Although the majority of the sizing and design considerations associated with the development of HCS 102 have preferably been based upon a nominal atmospheric pressure of 14.7 psia, it is anticipated that some applications will require that HCS 102 operate under an atmospheric pressure as low as about 11 psia. Applicant conducted a study to determine what, if any, effects on the performance of HCS 102 would arise if HCS 102 operated in enclosed environment 104 having an 11 psia pressure.

It should be noted that the atmospheric pressure drop from 14.7 psia to 11 psia does not alter water vapor production by the crew. Therefore, HCS 102 will still come in contact with the same amount of water vapor at the lower atmospheric pressure. The change in pressure has the potential of affecting only the volumetric flow rate that must enter the components of HCS 102 in order to remove the total mass of water in the volume of airflow 112 passing through. Although the volumetric flow required to remove the mass is reduced at the lower pressure, applicant determined that it is preferable to maintain the preferred 30 scfm volumetric flow rate, even while operating at atmospheric conditions of less than 14.7 psia.

Permeation of oxygen and nitrogen through chemically-selective membrane 116 was tested to determine potential changes in the gas composition of enclosed environment 104 under high permeation conditions. The initial testing was preferably design to determine if high permeation rates could result in a buildup of nitrogen and a corresponding loss of oxygen in enclosed environment 104 if nitrogen is used as dry gas 128 during ground operations. In one test, using an increased internal pressure within tubular-shaped membranes 121, the permeability of Nafion® was measured at $2.2 \times 10^{-11}$ mol/m-s at 140 kilopascal (kPa) delta pressures. In another test, using an increase in both relative humidity and temperature across chemically-selective membrane 116, the permeation of Oxygen and Hydrogen was observed. Assuming a surface area of about 7.6 m² per water-vapor removal module 106, the gain or loss to the spacecraft cabin was determined to be less than a milligram per day. Therefore the loss or gain of oxygen and nitrogen through the preferred chemically-selective membrane 116 was determined not to be an issue during nominal operations.

Figure 11A:
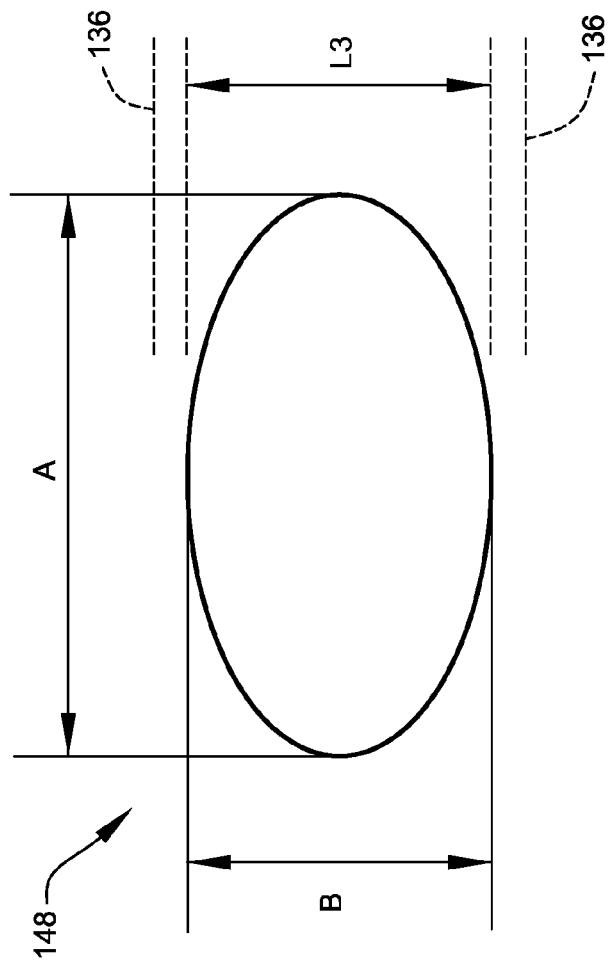
FIG. 11A shows a dimensional reference diagram of a preferred elliptical port geometry, of a vacuum vent access port, according to a preferred embodiment of the present invention.
Figure 11B:
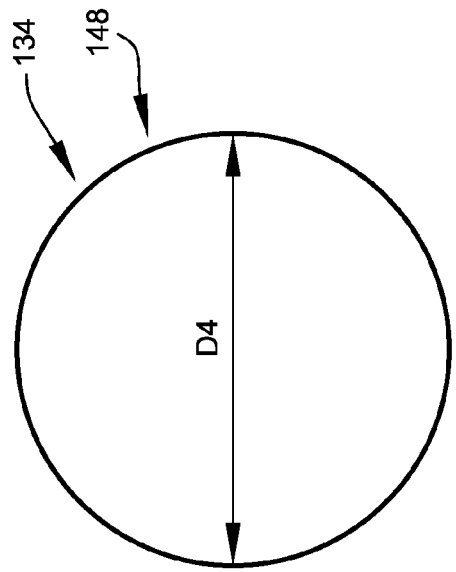
FIG. 11B shows a dimensional reference diagram of a preferred circular geometry, of a vacuum vent line and an alternate vacuum vent access port, according to preferred embodiments of the present invention.

FIG. 11A shows a dimensional reference diagram of a preferred elliptical port geometry, of vacuum vent access port 148, according to a preferred embodiment of the present invention. FIG. 11B shows a dimensional reference diagram of a preferred circular port geometry, of vacuum vent lines 134 and an alternate vacuum vent access port 148, according to preferred embodiments of the present invention.

The vacuum required to maintain the preferred maximum pressure differential is preferably about 1×10-1 Torr or about 13 Pa. This requirement drives the preferred vacuum vent sizing of vacuum vent lines 134 within exposure pathway 120 as the lowest possible pressure that must be achieved is the preferred 13-Pa value. To determine the optimal size of the vacuum vent lines 134 (preferably inclusive of the respective access ports 148 of water-vapor removal modules 106) the flow of exposure pathway 120 is assumed to be treated as a continuum. Preferably, the flow on the exposure pathway side of water-vapor removal modules 106 is not considered to be in the free molecular flow regime since the mean free path calculated at 13 Pa is significantly shorter in length (8.438× 10-8 m) than the preferred tube-to-tube membrane spacing and the potential diameter of the vacuum vent lines of exposure pathway 120. The temperature on the exposure pathway 120 side of water-vapor removal modules 106 is preferably assumed to be at the same temperature as on the side of HCS 102 exposed to airflow 112. The thermodynamic properties of the fluid flow within exposure pathway 120 are explained below.

One dimensional compressible Fanno Line Flow is preferably used to perform vacuum size estimates. The preferred vacuum pressure requirement for a representative spacecraft application is preferably utilized as the start point for the sizing effort. The preferred size of access ports 148 was preferably established using the preferred pressure requirement, the amount of mass that is transferred across the membrane, and the water vapor density at the inlet of tubular-shaped membrane 121.

Preferably, to size the fluid lines to space vacuum, an estimate of mass flow of water vapor is required. For a conservative estimate, it is preferably assumed that all water vapor entering HCS 102 is transported across chemically-selective membrane 116 and subsequently vented through exposure pathway 120 to space.

The following defined variables are present in the equations used in the preferred calculations below:

$\dot{m}_s$—mass flow rate of water vapor across chemically-selective membrane 116
$\rho_s$—water vapor density at outer membrane surface 127
$p_s$—water vapor pressure at outer membrane surface 127
$R/MW_{H_2O}$—water vapor gas constant (universal gas constant divided by water vapor molecular weight)
$T_{amb}$—ambient temperature of enclosed environment 104 (assumed the same on outer membrane surface 127)
$\dot{Q}_S$—volumetric flow rate at outer membrane surface 127
$\dot{Q}_{VL}$—volumetric flow rate per vacuum vent access port 148 of HCS 102
$a_S$—speed of sound of atmosphere within exposure pathway 120
$\gamma$—heat capacity ratio for H$_2$O vapor (isentropic expansion factor)

$$\frac{fL_{max}}{D} - \text{Fanno Flow ratio}$$

Flow velocity at the outer membrane surface 127 is affected by the pressure within exposure pathway 120. Static temperature and pressure decreases as it accelerates in water-vapor removal module 106 to the inlet of vacuum vent access port 148. Assuming the difference between static and stagnation (vacuum-exposure side) conditions is small; the ideal gas law is preferably used to calculate the density at the inlet to vacuum vent access port 148:

$$\rho_S = \frac{p_S}{\left(\frac{R}{MW_{H_2O}}\right) * T_{amb}} \quad \text{Equation 1}$$

The volumetric flow rate on the vacuum-exposure side is:

$$\dot{Q}_S = \frac{\dot{m}_S}{\rho_S} \quad \text{Equation 2}$$

Two vacuum vent access ports 148 are preferably supplied at each water-vapor removal module 106. The volumetric flow rate per vacuum vent access port 148 is therefore:

$$\dot{Q}_{VL} = \frac{\dot{Q}_S}{2} \quad \text{Equation 3}$$

The inlet velocity to a single vacuum vent access port 148 is:

$$V = \frac{\dot{Q}_{VL}}{A}$$

To calculate the corresponding Mach number, the speed of sound of the water vapor on the vacuum-exposure side is required. The speed of sound in the entrance to the vent line was preferably calculated using the Van Der Waals equation:

$$a_S = \sqrt{\gamma\left[\frac{R_{H_2O} * T_{amb}}{1 - (\beta * \rho_S)} + \frac{R_{H_2O} * T_{amb} * \rho_S * \beta}{(1 - (\beta * \rho_S))^2} - 2 * \alpha * \rho_S\right]} \quad \text{Equation 4}$$

Where the constants $\gamma$, $\alpha$, and $\beta$ are 1.33, 174.11, and 0.001378 respectively.

The Mach number to the inlet of the vacuum vent line is:

$$M = \frac{V}{a_S} = 0.269 \quad \text{Equation 5}$$

Using the Fanno Line flow equations, a first-order estimate of the maximum length of vacuum vent lines 134 for a given vent line diameter can be determined. For a given fL/D, maximum mass flow occurs with M=1 at the vacuum line exit. The Fanno Line Flow equation, given below, yields an $$\frac{fL_{max}}{D}$$

of about 1.08 for an inlet Mach number of about 0.27.

$$\frac{fL_{max}}{D} = \left(\frac{\gamma+1}{2\gamma}\right)\ln\left(\frac{\frac{\gamma+1}{2}}{1+\frac{\gamma-1}{2}M^2}\right) - \frac{1}{\gamma}\left(1 - \frac{1}{M^2}\right) - \left(\frac{\gamma+1}{2\gamma}\right)\ln\left(\frac{1}{M^2}\right) \quad \text{Equation 6}$$

It is noted that the stagnation temperature and pressure in HCS 102 to accelerate the flow to M=0.27 at the inlet of the tube is closer to 309K and 15 Pa.

As shown in FIG. 5, the preferred width W1 of side wall 140 will accommodates a vacuum vent access port 148 having a maximum port diameter D3 of about 3 inches. Such a 3-inch diameter vacuum vent access port 148 provides a Mach number of 0.456 and an $$\frac{fL_{max}}{D}$$

of 1.472 and with an assumed friction factor, f, of about 64/Re=0.76 (based on laminar flow); therefore, the theoretical maximum fluid-conducting line length that can be used with a 3-inch diameter duct, without restricting flow, is about 0.135 meter (m). To enable longer lines without restricting flow, a larger cross-sectional area within vacuum vent lines 134 is required.

In one highly-preferred embodiment of the system, two elliptical-shaped vacuum vent access ports 148 with an open interior area of about 0.00912 m$^2$ each are preferably used to connect water-vapor removal modules 106 to ambient environment 122. The equivalent circular diameter D4 of the oval ports is about 4.25 inches and the vacuum lines preferably comprise one or more transitions 174 (see FIG. 1) from the preferred elliptical-shape port at housing 138 to a circular tube with an open interior diameter D4 of about 4.25 inches to assist installation of the safety valves 113 (at least embodying herein wherein such at least one vacuum vent line comprises at least one transition structured and arranged to transition an open interior geometry of such at least one vacuum vent line from at least one open interior geometry matching such at least one essentially elliptical-shape, of such at least one vacuum vent access port, to at least one substantially circular open interior geometry having a cross-sectional area substantially matching that of such at least one essentially elliptical-shape). The elliptical ports preferably provide a friction factor of 0.594 and an $$\frac{fL_{max}}{D}$$

of 7.423 which allows for a 1.085 meter length of tube that reaches Mach 1 at the outlet. The preferred ellipse shape of FIG. 11A was preferably chosen to accommodate the fixed width W1 (FIG. 5) of housing 138 of water-vapor removal modules 106. Preferably, vacuum vent access port 148 comprises at least one open interior span having a dimension A greater than width W1 of side wall 140. Preferably, vacuum vent access port 148 comprises at least one open interior span having a dimension B about equal to the effective tube length L3. This preferred arrangement provides a port area larger than could be achieved by a circular port, which is limited to a size of roughly 3-inches in diameter, as dictated by the housing geometry (at least embodying herein wherein such at least one vacuum vent access port comprises at least one open interior span greater than such at least one width of said at least four adjoining side walls).

Table illustrates the performance capability of various sized vacuum vent lines 134 of exposure pathway 120.

TABLE 2

Ellipse HCS 102 Vent Line Port Calculations

| A, m (inch) | B, m (inch) | Area, m² | Vent Quantity | Max Vent Lenth, m | Vehicle external vent port Dia., Inches |
|---|---|---|---|---|---|
| 0.0762 (3) | 0.0762 (3) | 0.00456 | 2 | 0.135 | 3 |
| 0.0889 (3.5) | 0.0762 (3) | 0.00532 | 2 | 0.243 | 3.25 |
| 0.1016 (4) | 0.0762 (3) | 0.00608 | 2 | 0.375 | 3.46 |
| 0.1143 (4.5) | 0.0762 (3) | 0.006841 | 2 | 0.528 | 3.67 |
| 0.127 (5) | 0.0762 (3) | 0.0076 | 2 | 0.699 | 3.87 |
| 0.1397 (5.5) | 0.0762 (3) | 0.00836 | 2 | 0.885 | 4.06 |
| 0.1524 (6) | 0.0762 (3) | 0.00912 | 2 | 1.08 | 4.25 |
| 0.1651 (6.5) | 0.0762 (3) | 0.00988 | 2 | 1.29 | 4.42 |
| 0.1778 (7) | 0.0762 (3) | 0.01064 | 2 | 1.52 | 4.58 |

Table below provides a summary of the inputs and results for the above the analysis.

TABLE 3

HCS 102 Vent Line Sizing Variables
HCS Vent Line Sizing Variables

| Avogadro, Na | $6.02e^{23}$ |
|---|---|
| Gas C, R | 8.31 |
| Initial Total Pressure, Pa | 13 |
| Mass Flow of H2O, kg/s | $1.719e^{-4}$ |
| Density of H2O, kg/m³ | $9.04536e^{-5}$ |
| Boltzmann Constant | $1.38e^{-23}$ |
| H2O Molecule Diameter | $2.90e^{-8}$ |
| H2O Molecular Weight | 0.018 |
| Volume Flow per port, m³/s | 0.95 |
| Ellipse Height (B) | 0.076 |
| Ellipse Width (A) | 0.15 |
| Ellipse Perimeter | 0.76 |
| Equivalent Diameter, m | 0.087 |
| Pipe Area Assumption, m² | 0.00912 |
| Velocity of Flow, m/s | 116.93 |
| Isentropic Expansion Factor | 1.33 |
| Speed of Sound, m/s | 433.79 |
| Mach Number | 0.27 |
| Ellipse Hydraulic Diameter | 0.098 |
| FLmax/D | 7.42 |
| Reynolds Number | 107.58 |
| Friction Factor | 0.59 |
| Max Length, m | 1.085 |

Preferably, two elliptical shaped vacuum vent access ports 148 each having a preferred area of about 0.00912 m² were selected to allow each vacuum vent line 134 to comprise a length of up to about 1.085 meters. This design preference allows for the placement of spacecraft-air revitalization unit 101 at essentially any position within a six-foot diameter spacecraft shell, thus providing the vehicle designers with a high degree of flexibility. Upon reading this specification, those with ordinary skill in the art will now appreciate that, under appropriate circumstances, considering such issues as design preference, user preferences, cost, structural requirements, available materials, technological advances, etc., other port arrangements such as, for example, moving the vacuum ports exiting the modules to an equidistant location across the top of each housing to reduce the distance between the two ports, adding additional ports, altering the port entry into the Nafion® bed of the module to improve mass transfer rates at the center of the tube bundles, plumbing the vents into the Nafion® bundle through the center of the unit to minimize the mean free path between the tubes and the vacuum ports, etc., may suffice.

Vacuum vent lines 134 servicing vacuum vent access port 148 is preferably configured to allow decoupling of the respective the module. This allows the water-vapor removal modules 106 to be removed for inspection and service as required. Each vacuum vent access port 148 preferably comprises a removable coupler preferably configured to maintain a strong pressure seal and be vibration isolated. A vibration-isolated CF-type flange (also known as ConFlat) is preferably used as one preferred coupler. Such CF-type flanges are available from the Kurt J. Lesker Company of Clairton, Pa.

Due to the release of water vapor into vacuum vent lines 134, there is potential integrated failure mode associated with clogging of the vacuum lines by the formation of ice. Because HCS 102 requires access to vacuum to operate, the performance HCS 102 will significantly degrade if contact to space vacuum is no longer available. The vehicle preferred example vehicle can anticipate approximately 1 lb/hr of water vapor discharge during operation. Thus, the vehicle application must preferably comprise appropriate design features to ensure that ice does not accumulate to the point of clogging vacuum vent lines or 134 or external vent ports 131 during operation.

Using Fanno Line Flow expressions, the flow in the vacuum vent line will expand from roughly 13 Pa at the inlet to approximately 6 Pa at the terminus where M=1. The flow will disperse to space vacuum through a series of expansion waves outside vacuum vent line 134. Given that the pressure is always below the triple point temperature for water, water vapor conducted within exposure pathway 120 may deposit as ice on the walls of the vent lines if the temperature is sufficiently low. Applicant's Fanno Line Flow model suggests that the temperature will decrease from 298K at the inlet to approximately 265K. Under these conditions, the water vapor stream will remain vapor since the solid-vapor saturation temperature is roughly 230 Kelvin at 13 Pascals. As a result, the walls of vacuum vent lines 134 must preferably be maintained at the above-noted temperature or greater to prevent the formation of ice.

In addition to ice formation within exposure pathway 120, HCS 102 is preferably configured to manage two principal failure modes. These failure modes preferably include a break in chemically-selective membrane 116, which results in a leak to space vacuum, as well as clogging within the tubular-shaped membranes 121 that results in reduced system function. Both are discussed in detail in the following sections.

Figure 12:
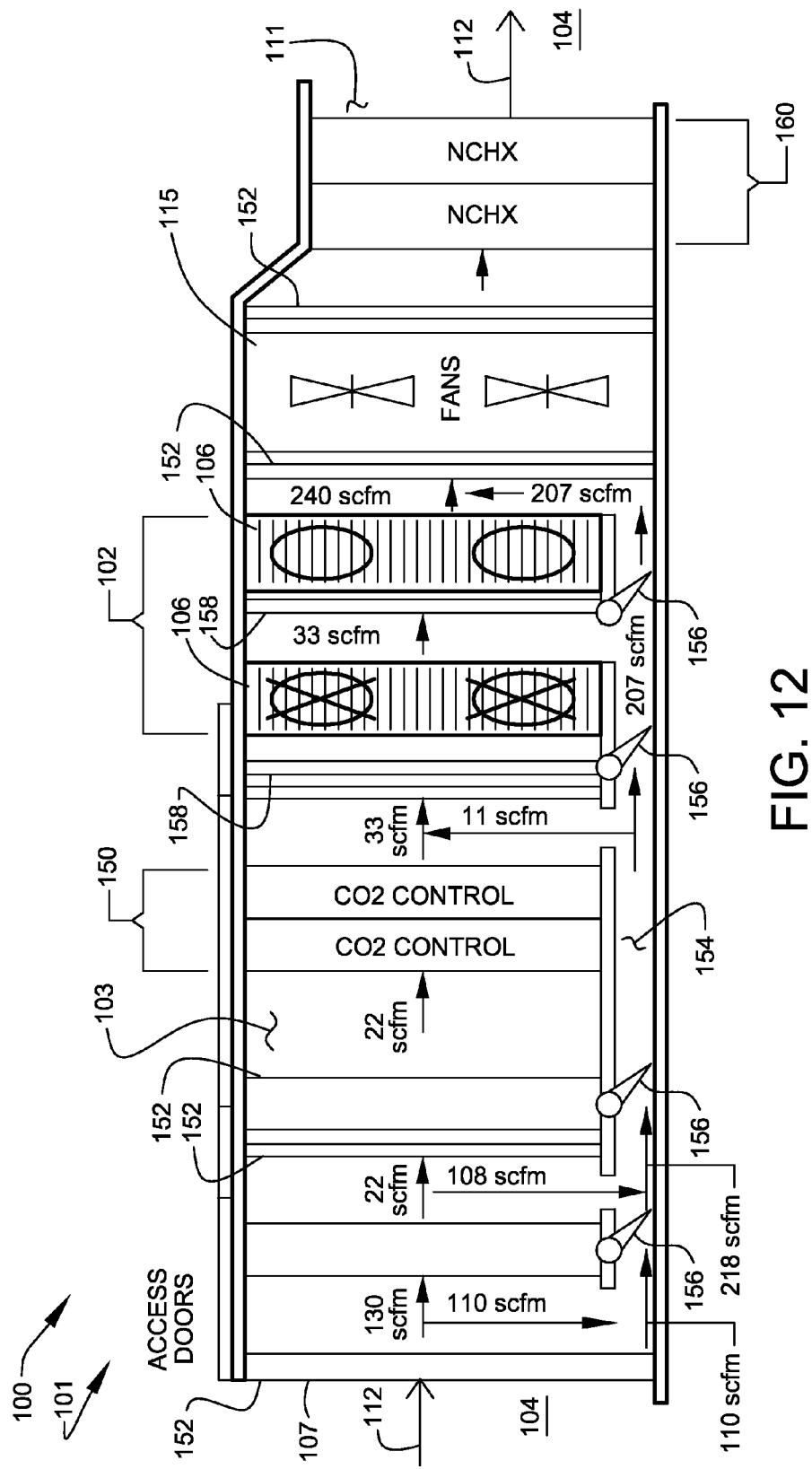
FIG. 12 shows a schematic diagram illustrating the preferred configuration of the humidity control subsystem and the spacecraft-air revitalization unit during a failure mode wherein a leak to vacuum has occurred.

FIG. 12 shows a schematic diagram illustrating the preferred configuration of HCS 102 and spacecraft-air revitalization unit 101 during a failure mode wherein a leak to vacuum has occurred, according to the preferred embodiment of FIG. 10. Of all failure modes, breakage of the tubular-shaped membranes 121 with leakage of cabin air to space represents the greatest risk; however, the preferred physical configuration of HCS 102 provide a high degree of inherent safety under this failure mode. More specifically, if a single tubular-shaped membrane 121 with a preferred inner diameter D1 of about 0.038 inch breaks completely and exposes both open ends of interior bore 123 to space vacuum, this condition creates an equivalent orifice size of about 0.054 in$^2$. Assuming a cabin pressure of about 14.7 psia is maintained at about 75° F., a discharge coefficient of about 0.72 and vacuum side pressure less than about 0.02 psia, a leak rate of only 0.033 lb/min or 47.5 lb/day will occur during this failure mode. It would take approximately 750 minutes for the pressure of enclosed environment 104 to drop to about 8 psi; therefore, this failure mode is manageable as the vehicle crew would have sufficient time to isolate the damaged water-vapor removal module 106 before an appreciable amount of gas was lost. The illustration of FIG. 12 demonstrates the failure and resulting system configuration.

During this failure mode, the leaking water-vapor removal module 106 is preferably cut off from the vacuum of exposure pathway 120 and the second module is preferably left in operation receiving about 33 scfm of airflow 112 for water vapor removal, as shown. Preferably, no direct crew action is required during this failure mode. Preferably, sensor-based controls operating the safety valves 113 controlling vacuum access through vacuum vent lines 134 will automatically detect and respond to a leak from the cabin to exposure pathway 120 and cut off exposure pathway 120 between external vent ports 131 and the leaking module bed. Since the volume of airflow 112 will not be changed or diverted regardless of which module experiences the leak, the setting of the flow control vanes 156 within air-bypass duct 154 are not changed during this failure mode.

Figure 13:
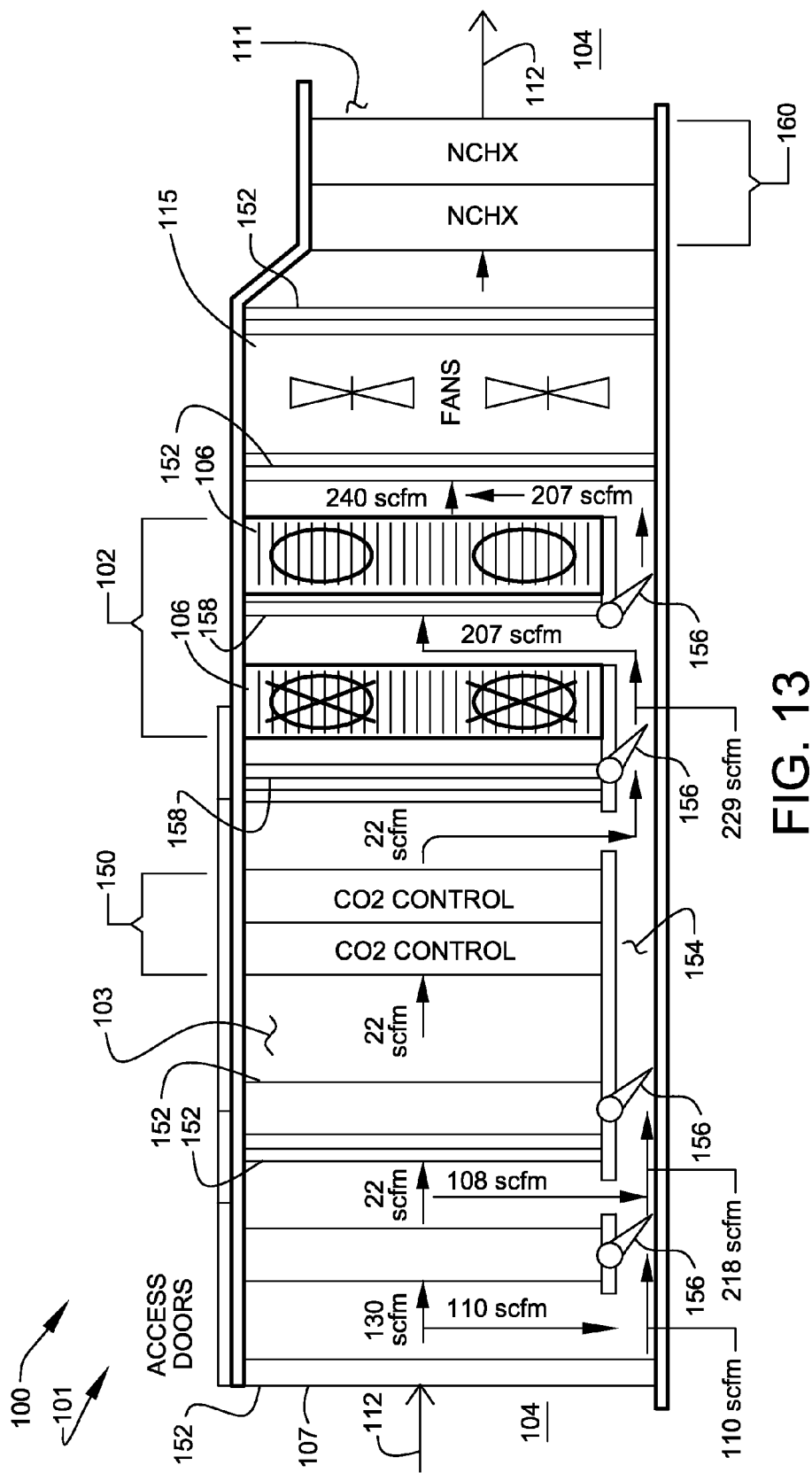
FIG. 13 shows a schematic diagram illustrating the preferred configuration of the humidity control subsystem and the spacecraft-air revitalization unit during a failure mode wherein formation of condensation or icing of the chemically-selective membrane has occurred.

FIG. 13 shows a schematic diagram illustrating the preferred configuration of HCS 102 and spacecraft-air revitalization unit 101 during a failure mode wherein formation of condensation or icing of chemically-selective membrane 116 has occurred, according to the preferred embodiment of FIG. 10. A second failure condition is associated with entry of liquid water into water-vapor removal modules 106. When the water is absorbed as water vapor then released as water vapor, there is no net change in phase, and consequently no net energy is consumed. If water is present as a liquid rather than as a vapor within the tubular membranes, it will still be absorbed as a liquid then released as a vapor, but now there is a change of phase from liquid to gas, requiring an input of energy. If liquid water is permitted to enter a water-vapor removal module 106, the transformation of the liquid into water vapor will draw heat from the unit, thus cooling it. As water-vapor removal module 106 cools, it condenses additional water. As the unit absorbs this additional liquid water, it will cool more rapidly. After a relatively short duration, the water-vapor removal module 106 will become cold and wet, with the module functioning essentially as a condenser rather than the intended permeable membrane dryer. In extreme cases where this evaporative cooling effect is combined with other concurrent component failures, frozen condensate may begin covering membrane wall 117 and may eventually plug the tubular-shaped membranes 121 of a module. At this point the water-vapor removal module 106 has failed. Preferably, the affected water-vapor removal module 106 must be relieved from service and dried before it can again function properly.

To reduce the potential for this failure to develop, spacecraft-air revitalization unit 101 preferably comprises at least one condensation prevention subassembly 162 structured and arranged to assist in preventing condensation of water vapor within water-vapor removal modules 106. Condensation prevention subassembly 162 (at least embodying herein at least one condensation preventer) preferably comprises at least one heat source 164 configured to provide heat to water-vapor removal modules 106 (at least embodying herein at least one heat provider structured and arranged to heat such at least one chemically-selective passage). Preferably, HCS 102 does not contain any moving parts and does not require any power from the overall vehicle system. To minimize the energy demands associated with the operation of condensation prevention subassembly 162, heat source 164 preferably utilizes thermal energy generated by at least one existing onboard vehicle subsystem. Most preferably, heat source 164 preferably utilizes thermal energy liberated by the exothermic lithium-hydroxide (LiOH) reaction of carbon dioxide control and removal section 150 (at least embodying herein condensation preventer means for assisting in preventing condensation of the water vapor at such chemically-selective passage means, wherein such condensation-preventer means comprises heat-source-provider means for providing at least one heat source to such water-vapor-remover means, and wherein such heat-source-provider means comprises exothermic gaseous-carbon-dioxide-remover means for removing gaseous carbon dioxide from the at least one enclosed spacecraft environment using at least one exothermic reaction). Preferably, water-vapor removal modules 106 are located directly downstream of carbon dioxide control and removal section 150, as shown. The adsorption of carbon dioxide by the LiOH results in a thermal generation rate of approximately 30 watts (W) per crewmember. The heat generated by carbon dioxide control and removal section 150 raises the dry bulb temperature of airflow 112 entering HCS 102 thus reducing the risk of runaway condensation.

Should a condition arise where liquid water enters HCS 102, condensation would first occur in the upstream module. As a preferred corrective measure, the upstream water-vapor removal module 106 would preferably be isolated from space vacuum using valves 113 of exposure pathway 120. The condensate within the upstream module would be allowed to evaporate into airflow 112 flowing through the unit, which would then be dried by the second water-vapor removal module 106.

If condensation occurs and trace contaminants exist in the condensate, unwanted chemical reactions involving the sulfonic acid groups of the Nafion® may occur, resulting in degradation of performance. If this degradation in performance becomes significant (the Nafion will always retain some transport capability, e.g., about 33% of full capacity), the affected components of HCS 102 preferably require regeneration. Regeneration preferably requires removal from the space craft and treatment in an acidic cleaning solution. It should be noted that this failure mode only occurs if condensation occurs and trace contaminants are present in airflow 112 delivered to HCS 102.

To mitigate this risk, condensation prevention subassembly 162 preferably comprises a set of pre filters 164 (see FIG. 12). Pre filters 164 preferably function as liquid-water filters preferably configured to filter liquid water from airflow 112 prior to passing through water-vapor removal modules 106. HCS 102 preferably comprises two pre filters 164 with one pre filter 164 preferably located before forward opening 142 of each water-vapor removal module 106, as shown. Each pre-filter 164 preferably comprises a fluid-permeable material 166 having a plurality of pores configured to block the passage of liquid water while passing other gas constituents of airflow 112. Preferably, substantially all the pores of material 166 preferably comprise a maximum size smaller than the preferred inner diameter D1 of tubular-shaped membranes 121. Each pre-filter 164 preferably comprises a fluid permeable material 166 having a preferred pore size roughly ten times smaller than the preferred inner diameter D1 of tubular-shaped membranes 121. With respect to airflow 112, carbon dioxide control and removal section 150 and liquid-water filter are preferably arranged so as to process airflow 112 in advance of water-vapor removal modules 106.

Preferably, water-vapor removal modules 106 are situate in line with other preferred air-revitalization components of spacecraft-air revitalization unit 101. For example, preferred embodiments of spacecraft-air revitalization unit 101 preferably include at least one airflow distributor 168 structured and arranged to assist even distribution of airflow 112 through water-vapor removal module 106. Furthermore, as generally illustrated in FIG. 10, preferred embodiments of spacecraft-air revitalization unit 101 preferably comprise at least one contaminant removal section 170 structured and arranged to remove contaminants from airflow 112. In one preferred embodiment of the present system, contaminant removal section 170 preferably comprises at least one particulate filter 172 structured and arranged to filter particulates from airflow 112 prior to passing through water-vapor removal modules 106. Upon reading this specification, those with ordinary skill in the art will now appreciate that, under appropriate circumstances, considering such issues as design preference, mission requirements, etc., other component arrangements such as, for example, components for trace contaminant control, components for post-fire atmosphere recovery, activated carbon filtering components, RH and temperature sensors, etc., may suffice.

The first water-vapor removal module 106 is preferably configured to protect the second module if a sufficient volume of liquid water gets across pre filters 164 and enters HCS 102 and the evaporation across the membrane into vacuum temporarily cools the membrane below the dew point of the incoming airflow 112. Theoretically, the condition could persist if the dew point of the incoming airflow 112 remains high. In rare conditions this could lead to the formation of ice at the first water-vapor removal module 106.

During this failure mode, the pressure drop across the first water-vapor removal module 106 would increase due to the blockage. If the situation does not self correct, the condensing water-vapor removal module 106 is preferably cut off from vacuum and allowed to recover as needed. If the module is completely blocked, the flow through the second module would be slightly off nominal at about 30.44 scfm until the first module recovered. The system is preferably designed to correct automatically without any corrective action required from the crew.

Figure 14:
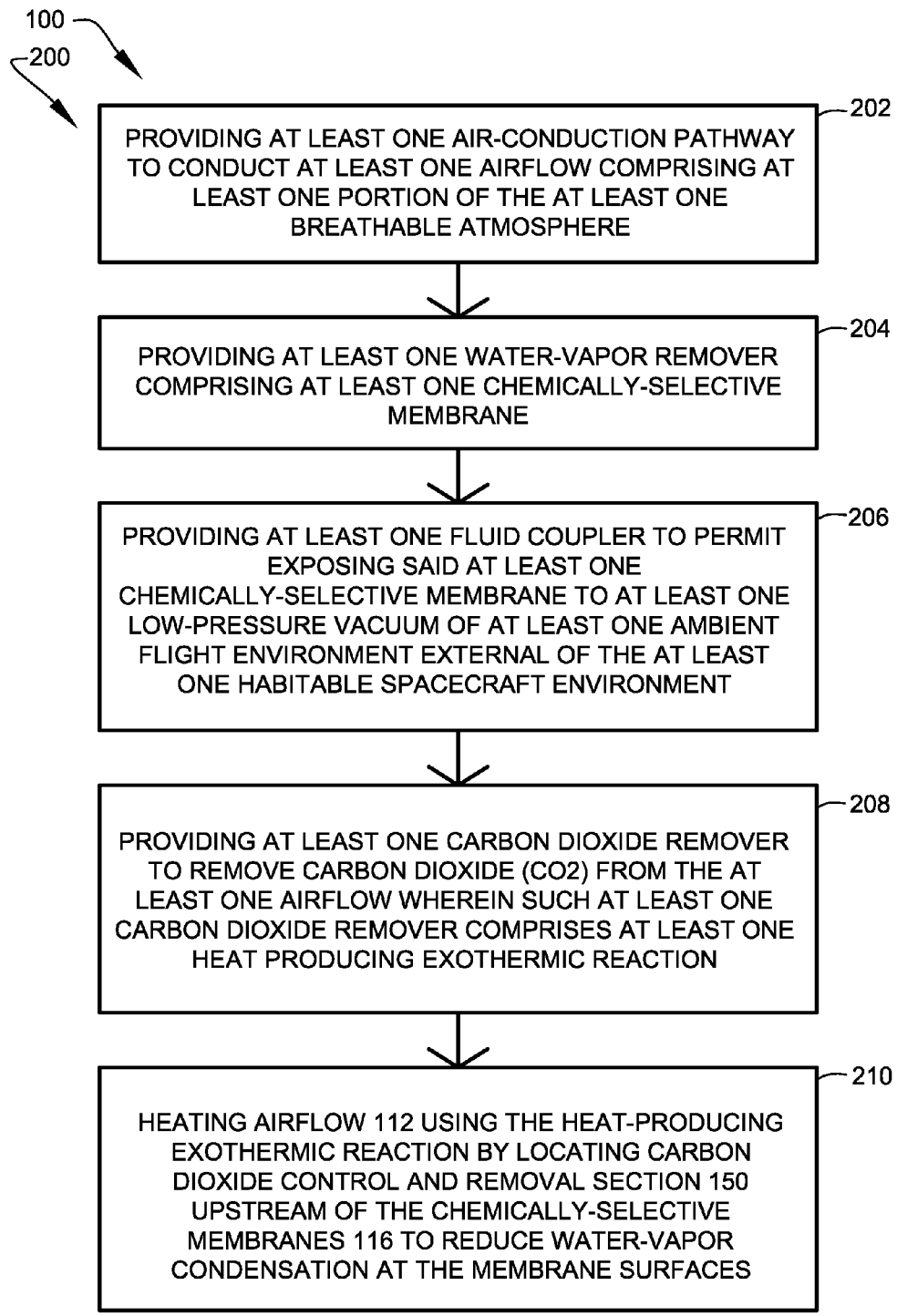
FIG. 14 shows a flow diagram illustrating a preferred method of the present invention, relating to assisting removing metabolic water vapor from the breathable atmosphere of a habitable spacecraft environment.

FIG. 14 shows a flow diagram illustrating preferred method 200 of spacecraft-air revitalization system 100, preferably relating to assisting removing metabolic water vapor from the breathable atmosphere of a habitable spacecraft environment. Method 200 preferably comprises the following steps. First, as indicated in preferred step 202, at least one means for establishing an air-conduction pathway 103 to conduct airflow 112 is provided. Airflow 112 is preferably derived by diverting a portion of the breathable atmosphere of enclosed environment 104. As previously described, air-conduction pathway 103 is preferably established within the preferred configuration of spacecraft-air revitalization unit 101.

Next, HCS 102 is preferably incorporated within spacecraft-air revitalization unit 101 as a water-vapor remover to remove the metabolic water vapor from airflow 112, as indicated in preferred step 204. As previously described, HCS 102 preferably comprises an arrangement of chemically-selective membranes 116 structured and arranged to provide selective passage of the metabolic water vapor based on chemical affinity.

Next, as indicated in preferred step 206, at least one fluid coupler is provided to permit the coupling of chemically-selective membranes 116 to at least one low-pressure ambient flight environment external of the at least one habitable spacecraft. Preferred step 206 enables the transport of the metabolic water vapor across chemically-selective membrane 116 during high altitude and orbital portions of the flight.

In addition, method 200 includes the preferred step 208 of providing carbon dioxide control and removal section 150 to remove carbon dioxide ($CO_2$) from airflow 112 wherein carbon dioxide control and removal section 150 is preferably configured to utilize at least one heat-producing exothermic reaction. As indicated in preferred step 210, carbon dioxide control and removal section 150 is preferably located upstream of the chemically-selective membranes 116 to preferably reduce water-vapor condensation at the membrane surfaces, preferably by heating airflow 112 using the heat-producing exothermic reaction. As previously described, chemically-selective membrane 116 preferably comprises at least one sulfonated perfluorinated ionomer, preferably Nafion®.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to assisting removing water vapor from at least one breathable atmosphere within at least one enclosed environment, said system comprising:
   a) at least one water-vapor remover structured and arranged to remove the water vapor from at least one airflow derived from the at least one breathable atmosphere;
   b) wherein said at least one water-vapor remover comprises
      i) at least one chemically-selective passage structured and arranged to provide selective passage of the water vapor based on chemical affinity, and ii) at least one transport-driver structured and arranged to drive transport of the water vapor across said at least one chemically-selective passage;

c) wherein said at least one transport-driver comprises at least one water-vapor-partial-pressure-differential provider structured and arranged to provide at least one water-vapor-partial-pressure differential across said at least one chemically-selective passage;

d) wherein said at least one water-vapor-partial-pressure-differential provider comprises at least one exposure pathway structured and arranged to expose said at least one chemically-selective passage to at least one ambient environment external of the at least one enclosed environment; and e) wherein said at least one water-vapor remover is structured and arranged to selectively purge the water vapor from the at least one airflow through said at least one chemically-selective passage to the at least one ambient environment when at least one water-vapor partial pressure of the at least one ambient environment is less than that of the at least one airflow.

2. The system according to claim 1 further comprising:
a) at least one air conductor structured and arranged to conduct the at least one airflow derived from the at least one breathable atmosphere;
b) wherein said at least one air conductor comprises at least one containment wall structured and arranged to contain the at least one airflow during such conduction;
c) wherein at least one portion of said at least one containment wall comprises at least one chemically-selective membrane; and
d) wherein said at least one chemically-selective membrane comprises said at least one chemically-selective passage.

3. The system according to claim 2 wherein said at least one chemically-selective membrane comprises at least one sulfonated perfluorinated ionomer.

4. The system according to claim 2 wherein said at least one chemically-selective membrane comprises at least one copolymer of perfluoro-3,6-dioxa-4-methyl-7octene-sulfonic acid and tetrafluoroethylene.

5. The system according to claim 2 wherein said at least one water-vapor-partial-pressure-differential provider further comprises:
a) at least one dry-gas coupler structured and arranged to communicatively couple said at least one chemically-selective membrane with at least one dry-gas source configured to supply at least one dry gas;
b) wherein said at least one water-vapor remover is structured and arranged to selectively transport the water vapor through said at least one chemically-selective membrane from the at least one airflow to the at least one dry gas when the at least one dry gas is supplied by the at least one dry-gas source.

6. The system according to claim 2 wherein said at least one water-vapor remover further comprises:
a) at least one water-vapor removal module comprising a plurality of tubular passages each one structured and arranged to conduct a portion of the at least one airflow;
b) wherein each tubular passage of said plurality comprises said at least one chemically-selective membrane.

7. The system according to claim 6 wherein each said at least one water-vapor removal module comprises between about 17,500 and about 28,000 tubular passages.

8. The system according to claim 6 wherein each said at least one water-vapor removal module comprises:

a) at least one housing to house said plurality of tubular passages;
b) wherein said at least one housing comprises at least four adjoining side walls, at least one forward opening, at least one rear opening, and at least one interior region situate within said at least four adjoining side walls;
c) wherein said at least one forward opening and said at least one rear opening are configured to assist intake and discharge of the at least one airflow; and
d) wherein at least one of said at least four adjoining side walls comprises at least one vacuum vent access port structured and arranged to establish at least one fluid connection between said at least one interior region and said at least one exposure pathway.

9. The system according to claim 8 further comprising:
a) located at said at least one forward opening and said at least one rear opening, at least one tubular passage positioner structured and arranged to position open end portions of each said at least one tubular passage within said at least one housing;
b) wherein each said at least one tubular passage positioner is structured and arranged to permit fluid exposure of at least one wall portion of said at least one tubular passages to fluids introduced within said at least one interior region.

10. The system according to claim 9 wherein:
a) each said at least four adjoining side walls comprise-at least one wall length and at least one wall width;
b) said at least one wall length is greater than said at least one wall width; and
c) said at least one vacuum vent access port comprises at least one open interior span greater than said at least one wall width of said at least four adjoining side walls.

11. The system according to claim 10 wherein:
a) each said at least one water-vapor removal module comprises at least two separate said at least one vacuum vent access ports; and
b) each said at least one vacuum vent access port comprises at least one essentially elliptical-shape.

12. The system according to claim 11 wherein:
a) said at least one exposure pathway comprises at least one vacuum vent line structured and arranged to assist coupling of said at least one vacuum vent access port to at least one vacuum of the ambient environment external of the at least one enclosed environment; and
b) said at least one vacuum vent line comprises at least one transition structured and arranged to transition an open interior geometry of said at least one vacuum vent line from at least one open interior geometry matching said at least one essentially elliptical-shape, of said at least one vacuum vent access port, to at least one substantially circular open interior geometry having a cross-sectional area substantially matching that of said at least one essentially elliptical-shape.

13. The system according to claim 6 wherein:
a) said at least one water-vapor removal module comprises at least one structural-deformation resistor structured and arranged to resist structural deformation of said tubular passage in the presence of a vacuum-pressure load;
b) wherein said at least one structural-deformation resistor comprises a plurality of support columns structured and arranged to resist pressure loading imparted by at least one atmospheric pressure differential between the at least one airflow and such vacuum; and
c) wherein said plurality of support columns are interspersed within said plurality of tubular passages.

14. The system according to claim 6 further comprising:
a) at least one first said at least one water-vapor removal module and at least one second said at least one water-vapor removal module, each one structured and arranged to be placed in fluid communication with said at least one exposure pathway and the at least one airflow;
b) wherein said at least one first said at least one water-vapor removal module and said at least one second said at least one water-vapor removal module are arranged in series with respect to the at least one airflow.

15. The system according to claim 14 wherein:
a) said at least one exposure pathway comprises at least one isolator valve structured and arranged to reversibly isolate either one of said at least one first said at least one water-vapor removal module and said at least one second said at least one water-vapor removal module from said at least one exposure pathway; and
b) operation of each said at least one water-vapor removal module is independently terminatable by closing of said at least one isolator valve.

16. The system according to claim 6 further comprising:
a) at least one condensation preventer structured and arranged to assist in preventing condensation of the water vapor at said at least one chemically-selective passage;
b) wherein said at least one condensation preventer comprises at least one heat provider structured and arranged to heat said at least one chemically-selective passage.

17. The system according to claim 16 wherein said at least one heat provider comprises at least one exothermic gaseous-carbon-dioxide remover structured and arranged to produce at least one heat output during such removal of the gaseous carbon dioxide from the at least one airflow.

18. The system according to claim 17 wherein said at least one exothermic gaseous-carbon-dioxide remover is structured and arranged to utilize at least one exothermic lithium-hydroxide (LiOH) reaction.

19. The system according to claim 16 further comprising at least one liquid-water filter structured and arranged to filter liquid water from the at least one airflow prior to passing through said at least one water-vapor removal module.

20. The system according to claim 19 wherein:
a) said at least one liquid-water filter comprises a plurality of pores structured and arranged to pass at least one portion of the at least one airflow; and
b) substantially all pores of said plurality comprise a maximum size smaller than a maximum internal size of each said tubular passage.

21. The system according to claim 19 wherein said at least one air conductor further comprises;
a) at least one inlet to inlet the at least one airflow comprising at least one portion of at least one breathable atmosphere;
b) at least one outlet to outlet the at least one airflow from said at least one air conductor; and
c) at least one air movement generator structured and arranged to generate movement of the at least one airflow between said at least one inlet and said at least one outlet.

22. The system according to claim 21 wherein:
a) with respect to the at least one airflow, said at least one exothermic gaseous-carbon-dioxide remover, said at least one liquid-water filter, said at least one airflow distributor, and said at least one water-vapor remover are coupled in operable series within said at least one air conductor; and b) within such operable series, at least said at least one exothermic gaseous-carbon-dioxide remover and said at least one liquid-water filter are structured and arranged to process the at least one airflow in advance of said at least one water-vapor remover.

23. The system according to claim 16 further comprising at least one airflow distributor structured and arranged to assist even distribution of the at least one airflow through said at least one water-vapor removal module.

24. The system according to claim 16 further comprising at least one contaminant remover structured and arranged to remove contaminants from the at least one airflow.

25. The system according to claim 24 wherein said at least one contaminant remover comprises at least one particulate filter structured and arranged to filter particulates from the at least one airflow prior to passing through said at least one water-vapor removal module.

26. A system, relating to assisting removing water vapor from at least one breathable atmosphere within at least one enclosed environment, said system comprising:
a) a set of water-vapor removers each water-vapor remover of said set structured and arranged to remove the water vapor from at least one airflow derived from the at least one breathable atmosphere;
b) wherein each said water-vapor remover comprises at least one chemically-selective membrane structured and arranged to provide selective passage of the water vapor based on chemical affinity; and
c) at least one transport-driver structured and arranged to drive transport of the water vapor across said at least one chemically-selective membrane;
d) wherein said at least one transport-driver comprises at least one water-vapor-partial-pressure-differential provider structured and arranged to provide at least one water-vapor-partial-pressure differential across said at least one chemically-selective membrane;
e) wherein said at least one water-vapor-partial-pressure-differential provider comprises at least one exposure pathway structured and arranged to enable exposure of said at least one chemically-selective membrane to at least one gas-pressure region having at least one water-vapor partial pressure lower than that of the at least one airflow;
f) wherein said at least one exposure pathway comprises at least one isolator valve structured and arranged to reversibly isolate either one of said water-vapor removers from said at least one exposure pathway; and
g) wherein operation of each said water-vapor removers is independently terminatable by closing of said at least one isolator valve.

27. The system according to claim 26 further comprising:
a) at least one condensation preventer structured and arranged to assist in preventing condensation of the water vapor at said at least one chemically-selective membrane;
b) wherein said at least one condensation preventer comprises at least one heat provider structured and arranged to heat said at least one chemically-selective membrane during operation.

28. The system according to claim 27 wherein:
a) said at least one heat provider comprises at least one exothermic gaseous-carbon-dioxide remover structured and arranged to produce at least one net heat output during such removal of the gaseous carbon dioxide from the at least one airflow;
b) with respect to the at least one airflow, said at least one exothermic gaseous-carbon-dioxide remover and said water-vapor removers are coupled in operable series within said at least one air conductor; and c) within such operable series, said at least one exothermic gaseous-carbon-dioxide remover is structured and arranged to process the at least one airflow in advance of said water-vapor removers.

29. The system according to claim 28 wherein said at least one chemically-selective membrane comprises at least one sulfonated perfluorinated ionomer.

30. The system according to claim 29 wherein said at least one exposure pathway is structured and arranged to expose said at least one chemically-selective membrane to at least one ambient vacuum environment external of the at least one enclosed environment.

31. The system according to claim 30 further comprising:
a) at least one flow controller to control at least one volume of the at least one airflow passing through said set of water-vapor removers;
b) wherein said at least one flow controller comprises at least one airflow bypass structured and arranged to bypass at least one portion of the at least one airflow past at least one of said water-vapor removers.

32. The system according to claim 28 wherein said at least one chemically-selective membrane comprises at least one copolymer of perfluoro-3,6-dioxa-4-methyl-7octene-sulfonic acid and tetrafluoroethylene.

33. A system, relating to assisting removing metabolic water vapor from at least one habitable spacecraft environment, comprising:

a) water-vapor-remover means for removing the metabolic water vapor from the at least one habitable spacecraft environment;
b) wherein said water-vapor remover means comprises
　i) chemically-selective-passage means for allowing the selective passage of the metabolic water vapor based on chemical affinity, and
ii) transport-driver means for driving transport of the metabolic water vapor across said chemically-selective passage means;
c) wherein said transport-driver means comprises water-vapor-partial-pressure-differential provider means for providing at least one water-vapor-partial-pressure differential across said chemically-selective passage means;
d) wherein said at least one water-vapor-partial-pressure-differential provider comprises exposure means for exposing said chemically-selective-passage means to at least one ambient flight environment external of the at least one habitable spacecraft environment; and
e) wherein said chemically-selective-passage means selectively removes the metabolic water vapor from the at least one airflow when at least one water-vapor partial pressure of the at least one ambient flight environment is less than that of the at least one airflow.

* * * * *